US011137832B2

(12) United States Patent
Katz

(10) Patent No.: US 11,137,832 B2
(45) Date of Patent: Oct. 5, 2021

(54) SYSTEMS AND METHODS TO PREDICT A USER ACTION WITHIN A VEHICLE

(71) Applicant: Eyesight Mobile Technologies, Ltd., Herzliya (IL)

(72) Inventor: Itay Katz, Tel Aviv (IL)

(73) Assignee: Eyesight Mobile Technologies, Ltd., Herzliya (IL)

( * ) Notice: Subject to any disclaimer, the term of this patent is extended or adjusted under 35 U.S.C. 154(b) by 0 days.

(21) Appl. No.: 16/703,759

(22) Filed: Dec. 4, 2019

(65) Prior Publication Data

US 2020/0103980 A1 Apr. 2, 2020

Related U.S. Application Data

(63) Continuation-in-part of application No. 16/272,292, filed on Feb. 11, 2019, now abandoned, which is a continuation of application No. 15/055,958, filed on Feb. 29, 2016, now Pat. No. 10,203,764, which is a continuation of application No. 14/078,636, filed on Nov. 13, 2013, now Pat. No. 9,274,608.

(60) Provisional application No. 61/725,559, filed on Dec. 13, 2012.

(51) Int. Cl.
*G06F 3/01* (2006.01)
*G06F 3/16* (2006.01)
*G06F 3/0482* (2013.01)
*G06F 3/0484* (2013.01)
*G06F 3/03* (2006.01)

(52) U.S. Cl.
CPC .............. *G06F 3/017* (2013.01); *G06F 3/011* (2013.01); *G06F 3/0304* (2013.01); *G06F 3/0482* (2013.01); *G06F 3/0484* (2013.01); *G06F 3/167* (2013.01)

(58) Field of Classification Search
CPC ........ G06F 3/017; G06F 3/011; G06F 3/0304; G06F 3/0482; G06F 3/0484; G06F 3/04842; G06F 3/04845; G06F 3/167
USPC .......................................................... 345/156
See application file for complete search history.

(56) References Cited

U.S. PATENT DOCUMENTS 6,791,531 B1 9/2004 Johnston et al.
8,971,565 B2 3/2015 Anzola
9,015,638 B2 4/2015 Kipman et al.
(Continued)

FOREIGN PATENT DOCUMENTS

WO WO 2012159254 11/2012

*Primary Examiner* — Tom V Sheng
(74) *Attorney, Agent, or Firm* — Finnegan, Henderson, Farabow, Garrett & Dunner, L.L.P.

(57) ABSTRACT

Systems, methods and non-transitory computer-readable media for triggering actions based on touch-free gesture detection are disclosed. The disclosed systems may include at least one processor. A processor may be configured to receive image information from an image sensor, detect in the image information a gesture performed by a user, detect a location of the gesture in the image information, access information associated with at least one control boundary, the control boundary relating to a physical dimension of a device in a field of view of the user, or a physical dimension of a body of the user as perceived by the image sensor, and cause an action associated with the detected gesture, the detected gesture location, and a relationship between the detected gesture location and the control boundary.

23 Claims, 6 Drawing Sheets

(56) References Cited

U.S. PATENT DOCUMENTS

| | | |
|---|---|---|
| 9,046,999 B1 | 6/2015 | Teller et al. |
| 9,274,608 B2 * | 3/2016 | Katz ..................... G06F 3/0484 |
| 9,400,562 B2 * | 7/2016 | Takazawa ............... G06F 3/017 |
| 10,203,764 B2 * | 2/2019 | Katz ..................... G06F 3/0482 |
| 2005/0162384 A1 | 7/2005 | Yokoyama |
| 2006/0097985 A1 * | 5/2006 | Ha ........................ G06F 3/0425 |
| | | 345/156 |
| 2007/0021207 A1 | 1/2007 | Ahdoot |
| 2008/0030460 A1 * | 2/2008 | Hildreth .................. G06T 7/593 |
| | | 345/156 |
| 2010/0231522 A1 | 9/2010 | Li |
| 2011/0025603 A1 | 2/2011 | Underkoffler et al. |
| 2011/0119640 A1 | 5/2011 | Berkes et al. |
| 2011/0209099 A1 | 8/2011 | Hinckley et al. |
| 2011/0296357 A1 | 12/2011 | Kim |
| 2012/0056833 A1 | 3/2012 | Narita et al. |
| 2012/0093360 A1 | 4/2012 | Subramanian et al. |
| 2012/0102437 A1 | 4/2012 | Worley et al. |
| 2012/0154303 A1 | 6/2012 | Lazaridis et al. |
| 2012/0162409 A1 | 6/2012 | Setiawan et al. |
| 2013/0035941 A1 | 2/2013 | Kim et al. |
| 2013/0088428 A1 * | 4/2013 | Ting .................... G06F 3/04847 |
| | | 345/157 |
| 2013/0120254 A1 | 5/2013 | Mun et al. |
| 2013/0145295 A1 * | 6/2013 | Bocking ............... G06F 3/0481 |
| | | 715/764 |
| 2013/0162513 A1 | 6/2013 | Ronkainen |
| 2013/0182077 A1 * | 7/2013 | Holz ........................ G06K 9/46 |
| | | 348/46 |
| 2013/0246955 A1 | 9/2013 | Schwesig et al. |
| 2013/0263036 A1 | 10/2013 | Berenson et al. |
| 2013/0343607 A1 | 12/2013 | Wilf et al. |
| 2014/0125813 A1 * | 5/2014 | Holz ........................ G06K 9/38 |
| | | 348/169 |
| 2015/0157931 A1 | 6/2015 | Adachi et al. |
| 2015/0302617 A1 * | 10/2015 | Shimura ................ G06T 11/20 |
| | | 345/441 |

* cited by examiner

SYSTEMS AND METHODS TO PREDICT A USER ACTION WITHIN A VEHICLE

PRIORITY CLAIM

This application is a continuation-in-part of application Ser. No. 16/272,292, filed on Feb. 11, 2019, which is a continuation of application Ser. No. 15/055,958, filed on Feb. 29, 2016, which is a continuation of application Ser. No. 14/078,636, filed on Nov. 13, 2013 and issued as U.S. Pat. No. 9,274,608 on Mar. 1, 2016, which claims the benefit of provisional application No. 61/725,559, filed on Dec. 13, 2012. The priority applications are all incorporated herein by reference in their entirety.

TECHNICAL FIELD

The present disclosure relates to the field of touch-free gesture detection and, more particularly, systems and computer-readable media for causing an action to occur based on a detected touch-free gesture using a control boundary. More particularly, the present disclosure relates to the use of machine learning algorithms to predict user gestures, behavior, or activity.

BACKGROUND

Permitting a user to interact with a device or an application running on a device is useful in many different settings. For example, keyboards, mice, and joysticks are often included with electronic systems to enable a user to input data, manipulate data, and cause a processor of the system to cause a variety of other actions. Traditional vehicular control devices also primarily use buttons, switches, levers, and other touch-based inputs. Increasingly, however, touch-based input devices, such as keyboards, mice, buttons, switches, and joysticks, are being replaced by, or supplemented with, devices that permit touch-free user interaction. For example, a system may include an image sensor to capture images of a user, including, for example, a user's hands and/or fingers. A processor may be configured to receive such images and cause actions to occur based on touch-free gestures performed by the user.

It may be desirable to permit a user to make a number of different touch-free gestures that can be recognized by a system. However, the number of different types of touch-free gestures that can be detected and acted upon by a system is often limited. Improvements in techniques for detecting and acting upon touch-free gestures are desirable.

SUMMARY

In one disclosed embodiment, a touch-free gesture recognition system is described. The touch-free gesture recognition system may include at least one processor configured to receive image information from an image sensor, detect in the image information a gesture performed by a user, detect a location of the gesture in the image information, access information associated with at least one control boundary, the control boundary relating to a physical dimension of a device in a field of view of the user, or a physical dimension of a body of the user as perceived by the image sensor and cause an action associated with the detected gesture, the detected gesture location, and a relationship between the detected gesture location and the control boundary.

In another disclosed embodiment, a non-transitory computer-readable medium is described. The non-transitory computer-readable medium may include instructions that, when executed by a processor, cause the processor to perform operations. The operations include receiving image information from an image sensor, detecting in the image information a gesture performed by a user, detecting a location of the gesture in the image information, accessing information associated with at least one control boundary, the control boundary relating to a physical dimension of a device in a field of view of the user, or a physical dimension of a body of the user as perceived by the image sensor, and causing an action associated with the detected gesture, the detected gesture location, and a relationship between the detected gesture location and the control boundary.

Additional aspects related to the embodiments will be set forth in part in the description which follows, and in part will be understood from the description, or may be learned by practice of the invention.

It is to be understood that both the foregoing general description and the following detailed description are exemplary and explanatory only and are not restrictive of the invention, as claimed.

DETAILED DESCRIPTION

Figure 1:
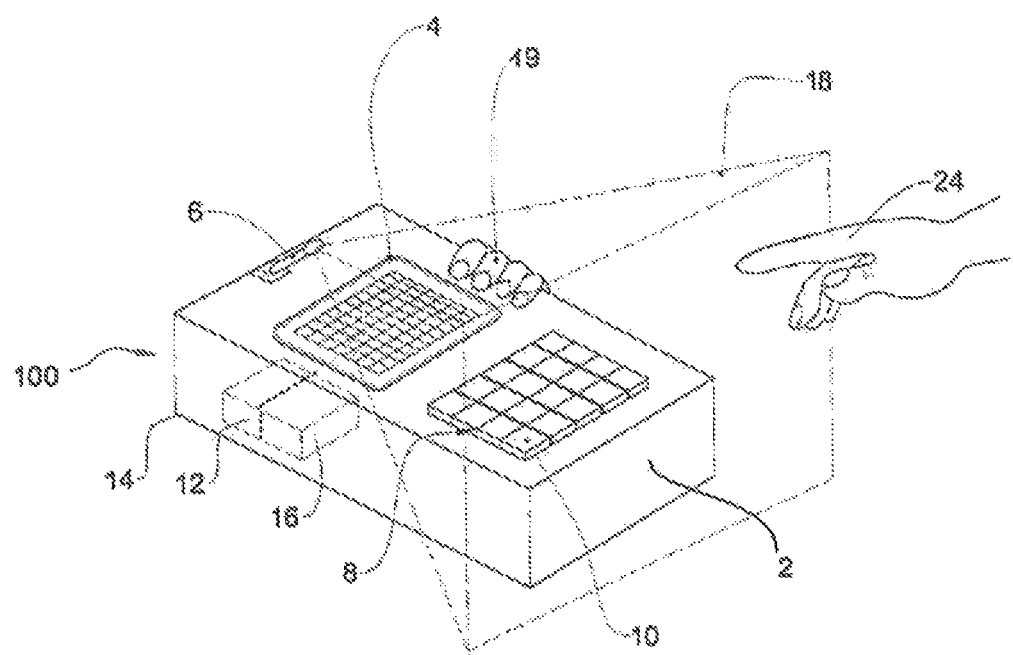
FIG. 1 illustrates an example touch-free gesture recognition system that may be used for implementing the disclosed embodiments.

Reference will now be made in detail to the example embodiments, which are illustrated in the accompanying drawings. Wherever possible, the same reference numbers will be used throughout the drawings to refer to the same or like parts.

A touch-free gesture recognition system is disclosed. A touch-free gesture recognition system may be any system in which, at least at some point during user interaction, the user is able to interact without physically contacting an interface such as, for example, a keyboard, mouse, or joystick. In some embodiments, the system includes at least one processor configured to receive image information from an image sensor. The processor may be configured to detect in the image information of a gesture performed by the user (e.g., a hand gesture) and to detect a location of the gesture in the image information. Moreover, in some embodiments, the processor is configured to access information associated with at least one control boundary, the control boundary relating to a physical dimension of a device in a field of view of the user, or a physical dimension of a body of the user as perceived by the image sensor. For example, and as described later in greater detail, a control boundary may be representative of an orthogonal projection of the physical edges of a device (e.g., a display) into 3D space or a projection of the physical edges of the device as is expected to be perceived by the user. Alternatively, or additionally, a control boundary may be representative of, for example, a boundary associated with the user's body (e.g., a contour of at least a portion of a user's body or a bounding shape such as a rectangular-shape surrounding a contour of a portion of the user's body). As described later in greater detail, a body of the user as perceived by the image sensor includes, for example, any portion of the image information captured by the image sensor that is associated with the visual appearance of the user's body.

In some embodiments, the processor is configured to cause an action associated with the detected gesture, the detected gesture location, and a relationship between the detected gesture location and the control boundary. The action performed by the processor may be, for example, generation of a message or execution of a command associated with the gesture. For example, the generated message or command may be addressed to any type of destination including, but not limited to, an operating system, one or more services, one or more applications, one or more devices, one or more remote applications, one or more remote services, or one or more remote devices.

For example, the action performed by the processor may comprise communicating with an external device or website responsive to selection of a graphical element. For example, the communication may include sending a message to an application running on the external device, a service running on the external device, an operating system running on the external device, a process running on the external device, one or more applications running on a processor of the external device, a software program running in the background of the external device, or to one or more services running on the external device. Moreover, for example, the action may include sending a message to an application running on a device, a service running on the device, an operating system running on the device, a process running on the device, one or more applications running on a processor of the device, a software program running in the background of the device, or to one or more services running on the device.

The action may also include, for example, responsive to a selection of a graphical element, sending a message requesting data relating to a graphical element identified in an image from an application running on the external device, a service running on the external device, an operating system running on the external device, a process running on the external device, one or more applications running on a processor of the external device, a software program running in the background of the external device, or to one or more services running on the external device. The action may also include, for example, responsive to a selection of a graphical element, sending a message requesting a data relating to a graphical element identified in an image from an application running on a device, a service running on the device, an operating system running on the device, a process running on the device, one or more applications running on a processor of the device, a software program running in the background of the device, or to one or more services running on the device.

The action may also include a command selected, for example, from a command to run an application on the external device or website, a command to stop an application running on the external device or website, a command to activate a service running on the external device or website, a command to stop a service running on the external device or website, or a command to send data relating to a graphical element identified in an image.

In some embodiments, the processor may be configured to collect information associated with the detected gesture, the detected gesture location, and/or a relationship between the detected gesture location and a control boundary over a period of time. The processor may store the collected information in memory. The collected information associated with the detected gesture, gesture location, and/or relationship between the detected gesture location and the control boundary may be used to predict user behavior.

In some embodiments, the processor may be configured to implement one or more machine learning techniques and algorithms to facilitate user behavior detection/predictions. In some embodiments, machine learning-based detection of user behavior may be performed offline by training or "teaching" a CNN (convolution neural network) user/driver behaviors using a database of images and videos of different users' behaviors (such as images/video of behaviors taking place in a vehicle, such as one or more users eating, talking, fixing their glasses/hair/makeup, searching for an item in a bag, holding a mobile phone, operating a device, touching etc.). In some embodiments, the detection of user behavior by machine learning take place by offline "teaching" of a neural network of different events/actions performed by a user/driver (such as user reaching toward an item, a user selecting an item, a user picking up an item, a user bring the item closer to his face, a user chewing, a user turn his or her head, a user looking aside, a user reaching toward an item behind them or in the back of a room or vehicle, a user talking, a user looking toward a main mirror such as a center rear-view mirror, a user shutting an item such as a door or compartment, a user coughing, or a user sneezing). Then, the system may detect, determine, and/or predict the user behavior using a combination of one or more action(s)/event(s) that were detected. Those of skill in the art will understand that the term "machine learning" is non-limiting, and may include techniques such as, but not limited to, computer vision learning, deep machine learning, deep learning and deep neural networks, neural networks, artificial intelligence, and online learning, i.e. learning during operation of the system. Machine learning may include one or more algorithms and mathematical models implemented and running on a processing device. The mathematical models that are implemented in a machine learning system may enable a system to learn and improve from data based on its statistical characteristics rather on predefined rules of human experts. Machine learning may also involve computer programs that can automatically access data and use the accessed data to "learn" how to perform a certain task without the input of detailed instructions for that task by a programmer.

Machine learning mathematical models may be shaped according to the structure of the machine learning system, supervised or unsupervised, the flow of data within the system, the input data and external triggers. In some aspects, machine learning can be related as an application of artificial intelligence (AI) that provides systems the ability to automatically learn and improve from data input without being explicitly programmed.

Machine learning may apply to various tasks, such as feature learning algorithms, sparse dictionary learning, anomaly detection, association rule learning, and collaborative filtering for recommendation systems. Machine learning may be used for feature extraction, dimensionality reduction, clustering, classifications, regression, or metric learning. Machine learning system may be supervised and semi-supervised, unsupervised, reinforced. Machine learning system may be implemented in various ways including linear and logistic regression, linear discriminant analysis, support vector machines (SVM), decision trees, random forests, ferns, Bayesian networks, boosting, genetic algorithms, simulated annealing, or convolutional neural networks (CNN).

Deep learning is a special implementation of a machine learning system. In one example, deep learning algorithms may discover multiple levels of representation, or a hierarchy of features, with higher-level, more abstract features extracted using lower-level features. Deep learning may be implemented in various feedforward or recurrent architectures including multi-layered perceptrons, convolutional neural networks, deep neural networks, deep belief networks, autoencoders, long short term memory (LSTM) networks, generative adversarial networks, and deep reinforcement networks.

The architectures mentioned above are not mutually exclusive and can be combined or used as building blocks for implementing other types of deep networks. For example, deep belief networks may be implemented using autoencoders. In turn, autoencoders may be implemented using multi-layered perceptrons or convolutional neural networks.

Training of a deep neural network may be cast as an optimization problem that involves minimizing a predefined objective (loss) function, which is a function of predetermined network parameters, actual measured or detected values, and desired predictions of those values. The goal is to minimize the differences between the actual value and the desired prediction by adjusting the network's parameters. In some embodiments, the optimization process is based on a stochastic gradient descent method which is typically implemented using a back-propagation algorithm. However, for some operating regimes, such as in online learning scenarios, stochastic gradient descent has various shortcomings, and other optimization methods may be employed to address these shortcomings. In some embodiments, deep neural networks may be used for predicting various human traits, behavior and actions from input sensor data such as still images, videos, sound and speech.

In some embodiments, machine learning system may go through multiple periods, such as, for example, an offline learning period and a real-time execution period. In the offline learning period, data may be entered into a "black box" for processing. The "black box" may be a different structure for each neural network, and the values in the "black box" may define the behavior of the neural network. In the offline learning period, the values in the "black box" may be changed automatically. Some neural networks or structures may require supervision, while others may not. In some embodiments, the machine learning system may not tag the data and extract only the outcomes. In a real-time execution period, the data may have entered through the neural network after the machine learning system finished the offline learning period. The values in the neural network may be fixed at this point. Unlike traditional algorithms, data entering the neural network may flow through the network instead of being stored or collected. After the data flows through the network, the network may provide different outputs, such as model outputs.

In some embodiments, a deep recurrent long short-term memory (LSTM) network may be used to anticipate a vehicle driver's/operator's behavior, or predict their actions before it happens, based on a collection of sensor data from one or more sensors configured to collect images such as video data, tactile feedback, and location data such as from a global positioning system (GPS). In some embodiments, prediction may occur a few seconds before the action happens. A "vehicle" may include a moving vessel or object that transports one or more persons or objects across land, air, sea, or space. Examples of vehicles may include a car, a motorcycle, a scooter, a truck, a bus, a sport utility vehicle, a boat, a personal watercraft, a ship, a recreational land/air/sea craft, a plane, a train, public/private transportation, a helicopter, a Vertical Take Off and Landing (VTOL) aircraft, a spacecraft, a military aircraft or boat or wheeled transport, a drone that is controlled/piloted by a remote driver, an autonomous flying vehicle, and any other machine that may be driven, piloted, or controlled by a human user. In some embodiments, vehicles may also include semi-autonomous or autonomous vehicles such as self-driving cars, autonomous driving or flying taxis, and other similar vehicles. It is to be understood that "vehicles" may also encompass future types of vehicles that transport persons from one location to another.

In some embodiments, the processor may be configured to implement one or more machine learning techniques and algorithms to facilitate detection/prediction of user behavior-related variables. The term "machine learning" is non-limiting, and may include techniques such as, but not limited to, computer vision learning, deep machine learning, deep learning, and deep neural networks, neural networks, artificial intelligence, and online learning, i.e. learning during operation of the system. Machine learning algorithms may detect one or more patterns in collected sensor data, such as image data, proximity sensor data, and data from other types of sensors disclosed herein. A machine learning component implemented by the processor may be trained using one or more training data sets based on correlations between collected sensor data or saved data and user behavior related variables of interest. Saved data may include data generated by another machine learning system, preprocessing analysis on received sensor data, and other data associated with the object or subject being observed by the system. Machine learning components may be continuously or periodically updated based on new training data sets and feedback loops.

Machine learning components can be used to detected or predicted gestures, motion, body posture, features associated with user alertness, driver alertness, fatigue, attentiveness to the road, distraction, features associated with expressions or emotions of a user, features associated with gaze direction of a user, driver or passenger. In some embodiments, machine learning components may determine a correlation or connection between a detected gaze direction (or change of gaze direction) of a user and a gesture that has occurred or is predicted to occur. Machine learning components can be used to detect or predict actions including: talking, shouting, singing, driving, sleeping, resting, smoking, reading, texting, operating a device (such as a mobile device or vehicle instrument) holding a mobile device, holding a mobile device against the cheek or to the face, holding a mobile device by hand for texting or speakerphone calling, watching content, playing digital game, using a head mount device such as smart glasses for virtual reality (VR) or augmented reality (AR), device learning, interacting with devices within a vehicle, buckling unbuckling or fixing a seat belt, wearing a seat belt, wearing a seat belt in a proper form, wearing a seatbelt in an improper form, opening a window, closing a window, getting in or out of the vehicle, attempting to open/close or unlock/lock a door, picking an object, looking/searching for an object, receiving an object through the window or door such as a ticket or food, reaching through the window or door while remaining seated, opening a compartment in the vehicle, raising a hand or object to shield against bright light while driving, interacting with other passengers, fixing or repositioning of eyeglasses, placing or removing or fixing eye contact lenses, fixing of hair or clothes, applying or removing makeup or lipstick, dressing or undressing, engaging in sexual activities, committing violent acts, looking at a mirror, communicating with another one or more persons/systems/AI entities using a digital device, learning the vehicle interior, features and characteristics associated with user behavior, interaction between the user and the environment, interaction with another person, activity of the user, an emotional state of the user, or an emotional responses in relation to: displayed/presented content, an event, a trigger, another person, one or more objects, or user activity in the vehicle.

In some embodiments, actions can be detected or predicted by analyzing visual input from one or more image sensor, including analyzing movement patterns of different part of the user body (such as different part of the user face including: mouse, eyes and head pose, movement of the user's arms/hands, movement or change of the user posture), detecting in the visual input interaction of the user with his/her surrounding (such as interaction with item in the interior of a vehicle, items in the vehicle, digital devices, personal items (such as a bag), other person. In some embodiments, actions can be detected or predicted by analyzing visual input from one or more image sensor and input from other sensors such as one or more microphone, one or more pressure sensor, one or more health status detection device or sensor. In some embodiments, the actions can be detected or predicted by analyzing input from one or more sensor and data from an application or online service.

Machine learning components can be used to detect: facial attributes including: head pose, gaze, face and facial attributes 3D location, facial expression; facial landmarks including: mouth, eyes, neck, nose, eyelids, iris, pupil; facial accessories including: glasses/sunglasses, piercings/earrings, or makeup; facial actions including: talking, yawning, blinking, pupil dilation, being surprised; occluding the face with other body parts (such as hand, fingers), with other object held by the user (a cap, food, phone), by other person (other person hand) or object (part of the vehicle), user unique expressions (such as Tourette Syndrome related expressions).

Machine learning system may use input from one or more systems in the car, including Advanced Driver Assistance System (ADAS), car speed measurement, left/right turn signals, steering wheel movements and location, wheel directions, car motion path, input indicating the surrounding around the car such as cameras or proximity sensors or distance sensors, Structure From Motion (SFM) and 3D reconstruction of the environment around the vehicle.

Machine learning components can be used to detect the occupancy of a vehicle's cabin, detecting and tracking people and objects, and acts according to their presence, position, pose, identity, age, gender, physical dimensions, state, emotion, health, head pose, gaze, gestures, facial features and expressions. Machine learning components can be used to detect one or more persons, a person's age or gender, a person's ethnicity, a person's height, a person's weight, a pregnancy state, a posture, an abnormal seating position (e.g. leg's up, lying down, turned around to face the back of the vehicle, etc.), seat validity (availability of a seatbelt), a posture of the person, seat belt fitting and tightness, an object, presence of an animal in the vehicle, presence and identification of one or more objects in the vehicle, learning the vehicle interior, an anomaly, a damaged item or portion of the vehicle interior, a child/baby seat in the vehicle, a number of persons in the vehicle, a detection of too many persons in a vehicle (e.g. 4 children in rear seat when only 3 are allowed), or a person sitting on another person's lap.

Machine learning components can be used to detect or predict features associated with user behavior, action, interaction with the environment, interaction with another person, activity, emotional state, emotional responses to: content, event, trigger another person, one or more object, detecting child presence in the car after all adults left the car, monitoring back-seat of a vehicle, identifying aggressive behavior, vandalism, vomiting, physical or mental distress, detecting actions such as smoking, eating and drinking, understanding the intention of the user through their gaze or other body features. In some embodiments, the user's behaviors, actions or attention may be correlated to the user's gaze direction or detected change in gaze direction. In some embodiments, one or more sensors may detect the user's behaviors, activities, actions, or level of attentiveness and correlate the detected behaviors, activities, actions, or level of attentiveness to the user's gaze direction or change in gaze direction. By way of example, the one or more sensors may detect the user's gesture of picking up a bottle in the car and correlate the user's detected gesture to the user's change in gaze direction to the bottle. By correlating the user's behaviors, activities, actions, or level of attentiveness to the user's gaze direction or change in gaze direction, the machine learning system may be able to detect a particular gesture performed by the user and predict, based on the detected gesture, a gaze direction, a change in gaze direction, or a level of attentiveness of the user.

It should be understood that the 'gaze of a user,' 'eye gaze,' etc., as described and/or referenced herein, can refer to the manner in which the eye(s) of a human user are positioned/focused. For example, the 'gaze' or 'eye gaze' of the user can refer to the direction towards which eye(s) of the user are directed or focused e.g., at a particular instance and/or over a period of time. By way of further example, the 'gaze of a user' can be or refer to the location the user looks at a particular moment. By way of yet further example, the 'gaze of a user' can be or refer to the direction the user looks at a particular moment.

Moreover, in some embodiments the described technologies can determine/extract the referenced gaze of a user using various techniques such as those known to those of ordinary skill in the art. For example, in certain implementations a sensor (e.g., an image sensor, camera, IR camera, etc.) may capture image(s) of eye(s) (e.g., one or both human eyes). Such image(s) can then be processed, e.g., to extract various features such as the pupil contour of the eye, reflections of the IR sources (e.g., glints), etc. The gaze or gaze vector(s) can then be computed/output, indicating the eyes' gaze points (which can correspond to a particular direction, location, object, etc.). Additionally, in some embodiments the disclosed technologies can compute, determine, etc., that gaze of the user is directed towards (or is likely to be directed towards) a particular item, object, etc., e.g., under certain circumstances.

Machine learning algorithms may detect one or more patterns in collected sensor data, such as image data, proximity sensor data, and data from other types of sensors disclosed herein. A machine learning component implemented by the processor may be trained using one or more training data sets based on correlations between collected sensor data and the detection of current or future gestures, activities and behaviors. Machine learning components may be continuously or periodically updated based on new training data sets and feedback loops indicating the accuracy of previously detected/predicted gestures.

Machine learning techniques such as deep learning may also be used to convert movement patterns and other sensor inputs to predict anticipated movements, gestures, or anticipated locations of body parts, such as by predicting that a finger will arrive at a certain location in space based on a detected movement pattern and the application of deep learning techniques.

Such techniques may also determine that a user is intending to perform a particular gesture based on detected movement patterns and deep learning algorithms correlating the detected patterns to an intended gesture. Consistent with these examples, some embodiments may also utilize machine learning models such as neural networks, that employ one or more network layers that generate outputs from a received input, in accordance with current values of a respective set of parameters. Neural networks may be used to predict an output for a received input using the one or more layers of the networks. Thus, the disclosed embodiments may, employ one or more machine learning techniques to provide enhanced detection and prediction of gestures, activities, and behaviors of a user using received sensor inputs in conjunction with training data or computer model layers.

Machine learning my also incorporate techniques that determine that a user is intending to perform a particular gesture or activity based on detected movement patterns and/or deep learning algorithms correlating data gathered from sensors to an intended gesture or activity. Sensors may include, for example, a CCD image sensor, a CMOS image sensor, a camera, a light sensor, an IR sensor, an ultrasonic sensor, a proximity sensor, a shortwave infrared (SWIR) image sensor, a reflectivity sensor, or any other device that is capable of sensing visual characteristics of an environment. Moreover, sensors may include, for example, a single photosensor or 1-D line sensor capable of scanning an area, a 2-D sensor, or a stereoscopic sensor that includes, for example, a plurality of 2-D image sensors. The sensor may also include, for example, an accelerometer, a gyroscope, a pressure sensor, or any other sensor that is capable of detecting information associated with a vehicle of the user. Data from sensors may be associated with users, driver, passengers, items, and detected activities or characteristics discussed above such as health condition of users, body posture, locations of users, location of users' body parts, user's gaze, communication with other users, devices, services, AI devices or applications, robots, implants.

In some embodiments, sensors may comprise one or more components. Components can include biometric components, motion components, environmental components, or position components, among a wide array of other components. For example, the biometric components can include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components can include acceleration sensor components (e.g., accelerometer), gravitation sensor components, rotation sensor components (e.g., gyroscope), and other known types of sensors for measuring motion. The environmental components can include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that can provide indications, measurements, or signals corresponding to a surrounding physical environment. The position components can include location sensor components (e.g., a Global Position System (GPS) receiver component), altitude sensor components (e.g., altimeters or barometers that detect air pressure from which altitude can be derived), orientation sensor components (e.g., magnetometers), and other known types of positional sensors. In some embodiments, sensors and sensor components may include physical sensors such as a pressure sensor located within a seat of a vehicle.

Data from sensors may be associated with an environment in which the user is located. Data associated with the environment may include the data related to internal or external parameters of the environment in which the user is located. Internal parameters may be associated with an in-car related parameter, such as parameters related to the people in the car (number of people, their location, age of the people, body size), parameters related to safety state of the people (such as seat-belt is on/off, position of mirrors), position of the seats, the temperature in the car, the amount of light in the car, state of windows, devices and applications that are active (such as car multimedia device, displays devices, sound level, phone call, video call, content/video that is displayed, digital games, VR/AR applications, interior/external video camera). External parameters may include parameters associated with the external environment in which the user is located, such as parameters associated with environment outside the car, parameters related to the environment (such as: the light outside, the direction and volume of the sun light, change in light condition, parameters related to weather, parameters related to the road conditions, the car location, signs, presented advertisements), parameters related to other cars, parameters related to users outside the vehicle including: the location of each user, age, direction of motion, activities such as: walking, running, riding a bike, looking on a display device, operating a device, texting, having a call, listen to music, intend to cross the road, crossing the road, falling, attentiveness to the surrounding.

Data may be associated with the car related data, such as car movement including: speed, accelerating, decelerating, rotation, tuning, stopping, emergent stop, sliding, devices and applications active in the car, operating status of driving including: manual driving (user driving the car), autonomous driving while driver attention is required, hall autonomous driving, change between modes of driving. Data may be received from one or more sensors associated with the car. For example, sensors may include, a CCD image sensor, a CMOS image sensor, a camera, a light sensor, an IR sensor, an ultrasonic sensor, a proximity sensor, a shortwave infrared (SWIR) image sensor, a reflectivity sensor, or any other device that is capable of sensing visual characteristics of an environment. Moreover, sensors may include, for example, a single photosensor or 1-D line sensor capable of scanning an area, a 2-D sensor, or a stereoscopic sensor that includes, for example, a plurality of 2-D image sensors. The sensor may also include, for example, an accelerometer, a gyroscope, a pressure sensor, or any other sensor that is capable of detecting information associated with a vehicle of the user. Images captured by an image sensor may be digitized by the image sensor and input to one or more processors, or may be input to the one or more processors in analog form and digitized by the processor. Example proximity sensors may include, among other things, one or more of a capacitive sensor, a capacitive displacement sensor, a laser rangefinder, a sensor that uses time-of-flight (TOF) technology, an IR sensor, a sensor that detects magnetic distortion, or any other sensor that is capable of generating information indicative of the presence of an object in proximity to the proximity sensor. In some embodiments, the information generated by a proximity sensor may include a distance of the object to the proximity sensor. A proximity sensor may be a single sensor or may be a set of sensors. Disclosed embodiments may include a single sensor or multiple types of sensors and/or multiple sensors of the same type. For example, multiple sensors may be disposed within a single device such as a data input device housing some or all components of the system, in a single device external to other components of the system, or in various other configurations having at least one external sensor and at least one sensor built into another component (e.g., a processor or a display of the system).

In some embodiments, a processor may be connected to or integrated within a sensor via one or more wired or wireless communication links, and may receive data from the sensor such as images, or any data capable of being collected by the sensor, such as is described herein. Such sensor data can include, for example, sensor data of a user's head, eyes, face, etc. Images may include one or more of an analog image captured by the sensor, a digital image captured or determined by the sensor, a subset of the digital or analog image captured by the sensor, digital information further processed by the processor, a mathematical representation or transformation of information associated with data sensed by the sensor, information presented as visual information such as frequency data representing the image, conceptual information such as presence of objects in the field of view of the sensor, etc. Images may also include information indicative the state of the sensor and or its parameters during capturing images e.g. exposure, frame rate, resolution of the image, color bit resolution, depth resolution, field of view of the sensor, including information from other sensor(s) during the capturing of an image, e.g. proximity sensor information, acceleration sensor (e.g., accelerometer) information, information describing further processing that took place further to capture the image, illumination condition during capturing images, features extracted from a digital image by the sensor, or any other information associated with sensor data sensed by the sensor. Moreover, the referenced images may include information associated with static images, motion images (i.e., video), or any other visual-based data. In certain implementations, sensor data received from one or more sensor(s) may include motion data, GPS location coordinates and/or direction vectors, eye gaze information, sound data, and any data types measurable by various sensor types. Additionally, in certain implementations, sensor data may include metrics obtained by analyzing combinations of data from two or more sensors.

In some embodiments, one or more sensors associated with the vehicle of the user may be able to detect information or data associated with the vehicle over a predetermined period of time. By way of example, a pressure sensor associated with the vehicle may be able to detect pressure value data associated with the vehicle over a predetermined period of time, and a processor may monitor a pattern of pressure values. The processor may also be able to detect a change in pattern of the pressure values. The change in pattern may include, but is not limited to, an abnormality in the pattern of values or a shift in the pattern of values to a new pattern of values. The processor may detect the change in pattern of the values and correlate the change a detected gesture, activity, or behavior of the user. Based on the correlation, the processor may be able to predict an intention of the user to perform a particular gesture based on a detected pattern. In another example, the processor may be able to detect or predict the driver's level of attentiveness to the road during a change in operation mode of the vehicle, based on the data from the one or more sensors associated with the vehicle. For example, the processor may be configured to determine the driver's level of attentiveness to the road during the transaction/change, between an autonomous driving mode to a manual driving mode based on data associated with the behavior or activity the driver was engaged in before and during the change in the operation mode of the vehicle.

In some embodiments, the processor may be configured to receive data associated with events that were already detected or predicted by the system or other systems, including forecasted events. For example, data may include events that are predicted before the events actually occur. In some embodiments, the forecasted events may be predicted based on the events that were already detected by the system or other systems. Such events may include actions, gestures, behaviors performed by the user, driver or passenger. By way of example, the system may predict a change in the gaze direction of a user before the gaze direction actually changes. In addition, the system may detect a gesture of a user toward an object and predict that the user will shift his or her gaze toward the object once the user's hand reaches a predetermined distance from the object. In some embodiments, the system may predict forecasted events, via a machine learning algorithms, based on events that were already detected. In other embodiments, the system may predict at least one of the user behavior, an intention to perform a gesture, or an intention to perform an activity based on the data associated with events that were already detected or predicted, including forecasted events.

The processor may perform various actions using machine learning algorithms. For example, machine learning algorithms may be used to detect and classify gestures, activity or behavior performed in relation to at least one of the user's body or other objects proximate the user. In one implementation, the machine learning algorithms may be used to detect and classify gestures, activity or behavior performed in relation to a user's face, to predict activities such as yawning, smoking, scratching, fixing an a position of glasses, put on/off glasses or fixing their position on the face, occlusion of a hand with features of the face (features that may be critical for detection of driver attentiveness, such as driver's eyes); or a gesture of one hand in relation to the other hand, to predict activities involving two hands which are not related to driving (e.g. opening a drinking can or a bottle, handling food). In another implementation, other objects proximate the user may include controlling a multimedia system, a gesture toward a mobile device that is placed next to the user, a gesture toward an application running on a digital device, a gesture toward the mirror in the car, or fixing the side mirrors. In some embodiments, the processor is configured to predict an activity associated with a device, such as fixing the mirror, by detecting a gesture toward the device (e.g. toward a mirror); wherein detecting a gesture toward a device comprise detecting a motion vector of the gesture (can be linear or non-linear) and determine the associated device that the gesture is addressing. In one implementation, the "gesture toward a device" is determined when the user hand or finger crossed a defined boundary associated with the device, while in another implementation the motion vector of the user's hand or one or more finger, is along a vector that may end at the device and although the hand or one or more finger didn't reach the device, there is no other device located between the location of the hand or finger until the device. For example, the driver lifts his right hand toward the mirror. At the beginning of the lifting motion, there are several possible devices toward which the driver makes a gesture, such as the multimedia, air condition or the mirror. During the gesture, the hand is raised above the multimedia device, then above the air-condition controllers. At this point, the processor may detect a motion vector that can end at the mirror, and that the motion vector of the hand or finger already passed the multimedia and air-condition controllers, and there are no other devices but the mirror on which the gesture may address. The processor may be configured to determinate that at that point, the gesture is toward the mirror (even that the gesture was not yet ended, and the hand is yet to touch the mirror).

In other embodiments, machine learning algorithms may be used to detect various features associated with the gestures performed. For example, machine learning algorithms and/or traditional algorithms may be used to detect a speed, smoothness, direction, motion path, continuity, location and/or size of the gestures performed. One or more known techniques may be employed for such detection, and some examples are provided in U.S. Pat. Nos. 8,199,115 and 9,405,970, which are incorporated herein by reference. Traditional algorithms may include, for example, an object recognition algorithm, an object tracking algorithm, segmentation algorithm, and/or any known algorithms in the art to detect a speed, smoothness, direction, motion path, continuity, location, size of an object, and/or size of the gesture. The processor may also be configured to detect a speed, smoothness, direction, motion path, continuity, location and/or size of components associated with the gesture, such as hands, fingers, other body parts, or objects moved by the user.

In some embodiments, the processor may be configured to detect a change in the user's gaze before, during, and after the gesture is performed. In some embodiments, the processor may be configured to determine features associated with the gesture and a change in user's gaze detection before, during, and after the gesture is performed. The processor may also be configured to predict a change in gaze direction of the user based on the features associated with the gesture. In some embodiments, the processor may be configured to predict a change of gaze direction using criteria saved in a memory, historical information previously extracted and associated with a previous occurrence associated with the gesture performance and/or driver behavior and/or driver activity and an associated direction of gaze before, during and after the gesture and/or behavior and/or activity is performed. The processor may also be configured to predict a change of gaze direction using information associated with passenger activity or behavior, and/or interaction of the driver with other passenger, using criteria saved in a memory, information extracted in previous time associated with passenger activity or behavior, and/or interaction of the driver with other passenger, and direction of gaze before, during and after the gesture is performed.

In some embodiments, the processor may be configured to predict a change of gaze direction using information associated with level of driver attentiveness to the road, and gesture and/or behavior and/or activity and/or event that takes place in the vehicle, using criteria saved in a memory, information extracted in previous time associated with driver attentiveness to the road, and gesture performance and direction of gaze before, during and after the event occurs. Further, the processor may be configured to predict a change of gaze direction using information associated with detected of repetitive gestures, gestures that are in relation to other body part, gestures that are in relation to devices in the vehicle.

In some embodiments, machine learning algorithms may enable the processor to determine a correlation between the detected gestures, the location of the gestures, the nature of the gestures, the features of the gestures, and the user's behavior. The features of the gestures may include, for example, a frequency of the gestures detected during a predefined time period. In other embodiments, machine learning algorithms may train the processor to correlate the detected gesture to the user's level of attention. For example, the processor may be able to correlate the detected gesture of a user who is a driver of a vehicle to determine the level of attention of the driver to the road, or correlated to the user's driving behaviors determined, for example, using data associated with the vehicle movement patterns. Furthermore, the processor may be configured to correlate the detected gesture of a user, who may be a driver of a vehicle, to the response time of the user to an event taking place. The even taking place may be associated with the vehicle. For example, the processor may be configured to correlate a detected gesture performed by a driver of a vehicle, to the response time of applying brakes when a vehicle in front of the driver's vehicle is stopped, changes lanes, or changes its path, or an event of a pedestrian crossing the road in front of the driver's vehicle. In some embodiments, the response time of the user to the event taking place may be, for example, the time it takes for the user to control an operation of the vehicle during transitioning of an operation mode of the vehicle. The processor may be configured to correlate a detected gesture performed by a driver of a vehicle, to the response time of the driver following or addressing an instruction to take charge and control the vehicle when the vehicle transitions from autonomous mode to manual driving mode. In such embodiments, the operation mode of the vehicle may be controlled and changed in association with detected gestures and/or predicted behavior of the user.

In some embodiments, the processor may be configured to correlate a detected gesture performed by a user who may not be the driver, and a change in the driver's level of attentiveness to the road, a change in the driver gaze direction, and/or a predicted gesture to be performed by the driver. Examples of gestures performed by a user who may not be the driver may include, for example, changing the volume setting of the car stereo, change a mode of multimedia operation, change parameters of the air-conditioner, searching for something in the vehicle, opening vehicle compartments, twist the body position backwards to talk with the passengers in the back (such as talking to the kids in the back), buckling or unbuckling the seat-belt, changing seating position, adjusting the location or position of a seat, opening a window or door, reaching out of the vehicle through the window or door, or passing an object into or out of the vehicle.

In yet another embodiment, machine learning algorithms may train the processor to correlate detected gestures to a change in user's gaze direction before, during, and after the gesture is performed by the user. By way of example, when the processor detects the user moving the user's hand toward a multimedia system in a car, the processor may be able to predict that the user's gaze will follow the user's finger rather than stay on the road when the user's fingers move near the display or touch-display of the multimedia system.

In some embodiments, machine learning algorithms may configure the processor to predict the direction of driver gaze along a sequence of time in relation to a detected gesture. For example, machine learning algorithms may configure the processor to detect the driver's gesture towards an object and predict that the direction of the driver's gaze will shift towards the object after a first period of time. The machine learning algorithms may also configure the processor to predict that the driver's gaze will shift back towards the road after a second period of time after the driver's gaze has shifted towards the object. The first, and/or second period of time may be values saved in the memory, values that were detected in previous similar event of that driver, or values that represent a statistical value. As a non-limiting example, when a driver begins a gesture toward a multimedia device (such as changing a radio station or selecting an audio track), the processor may predict that the driver's gaze will shift downward and to the side toward the multimedia device for 2 seconds, and then will shift back to the road after another 600 milliseconds. As another example, when the driver begins looking toward the main rear-view mirror, the processor may predict that the gaze will shift upward and toward the center for about 2-3 seconds. In yet another embodiment, the processor may be configured to predict when and for how long the driver gaze will be shifted from the road using information associated with previous events performed by the driver.

In yet another embodiment, the processor may be configured to receive information from one or more sensors, devices, or applications in a vehicle of the user and predict a change in gaze direction of the user based on the received information. For example, the processor may be configured to receive data associated with active devices, applications, or sensors in the car, for example data from multimedia systems, navigation systems, or microphones, and predict the direction of a driver's gaze in relation to the data. In some embodiments, an active device may include a multimedia system, an application and include a navigation system, and a sensor in the car may include a microphone. The processor may be configured to analyze the data received. For example, the processor may be configured to analyze data received via speech recognition performed on microphone data to determine the content of a discussion/talk in the vehicle. In this example, data is gathered by a microphone, a speech recognition analyzer is employed by the processor to identify spoken words in the data, and the processor may determine that a child sitting in the back of the vehicle has asked the driver to pick up a gaming device that was just fell from his hands. In such an example, the machine learning algorithms may enable the processor to predict that the driver's gaze will divert from the road to the rear seat as the driver responds to the child's request.

In yet another embodiment, the processor may be configured to predict a sequence or frequency of change of driver gaze direction from the road toward a device/object or a person. In one example, the processor predicts a sequence or frequency of change of driver gaze direction from the road by detect an activity the driver is involved with or detect a gesture performed by the driver, detect the object or device associated with the detected gesture and determine the activity the driver is involving with. For example, the processor may detect the driver looking for an object in a bag located on the other seat, or for a song in the multimedia application. Based on the detected activity of the driver, the processor may be configured to predict that the driver's change in gaze direction from the road to the object and/or the song will continue until the driver finds the desired object and/or song. The processor may be configured to predict the sequence of this change in driver's gaze direction. Accordingly, the processor may be configured to predict that each subsequent change in gaze direction will increase in time as long as the driver's gaze is toward the desired object and/or song, rather than toward the road. In some embodiments, the processor may be configured to predict the level of driver attentiveness using data associated with features related to the change of gaze direction. For example, the predicted driver attentiveness may be predicted in relation to the time of the change in gaze direction (from the road, to the device, and back to the road), the gesture/activity/behavior the driver performs, sequence of gaze direction, frequency of gaze direction, or the volume or magnitude of the change in gaze direction.

In some embodiments, machine learning algorithms may configure the processor to predict the direction of the driver's gaze wherein the prediction is in a form of a distribution function. In some embodiments, the processor may be configured to generate a message or a command associated with the detected or predicted change in gaze direction. In such embodiments, the processor may generate a command or message in response to any of the detected or predicted scenarios or events discussed above. The message or command generated may be audible or visual, or may comprise a command generated and sent to another system or software application. For example, the processor may be configured to generate an audible or visual message after detecting that the driver's gaze has shifted towards an object for a period of time greater than a predetermined threshold. In some embodiments, the processor may be configured to alert the driver that the driver should not operate the vehicle. In other embodiments, the processor may be configured to control an operation mode of the vehicle based on the detected or predicted change in gaze direction. For example, the processor may be configured to change the operation mode of the vehicle from a manual driving mode to an autonomous driving mode based on the detected or predicted change in gaze direction. In some embodiments, the processor may be configured to activate or deactivate functions related to the vehicle, to the control over the vehicle, to the vehicle movement including stopping the vehicle, to devices or sub-systems in the vehicle. In some embodiments, the processor may be configured to communicate with other cars, with one or more systems associated lights control or with any system associated with transportation.

In some embodiments, the processor may be configured to generate a message or a command based on the prediction. The message or command may be generated to other systems, devices, or software applications. In some aspects, the message or command may be generated to other systems, devices, or applications located in the user's car or located outside the user's car. For example, the message or command may be generated to a cloud system or other remote devices or cars. In some embodiments, the message or command generated may indicate the detected or forecasted behavior of the user, including, for example, data associated with a gaze direction of the user or attention parameters of the user.

In some embodiments, a message to a device may be a command. The command may be selected, for example, from a command to run an application on the device, a command to stop an application running on the device or website, a command to activate a service running on the device, a command to stop a service running on the device, a command to activate a service or a process running on the external device or a command to send data relating to a graphical element identified in an image.

The action may also include, for example responsive to a selection of a graphical element, receiving from the external device or website data relating to a graphical element identified in an image and presenting the received data to a user. The communication with the external device or website may be over a communication network.

Gestures may be one-handed or two handed. Exemplary actions associated with a two-handed gesture can include, for example, selecting an area, zooming in or out of the selected area by moving the fingertips away from or towards each other, rotation of the selected area by a rotational movement of the fingertips. Actions associated with a two-finger pointing gesture can include creating an interaction between two objects, such as combining a music track with a video track or for a gaming interaction such as selecting an object by pointing with one finger, and setting the direction of its movement by pointing to a location on the display with another finger.

Gestures may be any motion of one or more part of the user's body, whether the motion of that one or more part is performed mindfully (e.g., purposefully) or not, as an action with a purpose to activate something (such as turn on/off the air-condition) or as a way of expression (such as when people are talking and moving their hands simultaneously, or nodding with their head while listening). The motion may be of one or more parts of the user's body in relation to another part of the user's body. In some embodiments, a gesture may be associated with addressing a body disturbance, whether the gesture is performed by the user's hand(s) or finger(s) such as scratching a body part of the user, such as eye, nose, mouth, ear, neck, shoulder. In some embodiments, a gesture may be associated with a movement of part of the body such as stretching the neck, the shoulders, the back by different movement of the body, or associated with a movement of the entire body such as changing the position of the body. A gesture may also be any motion of one or more parts of the user's body in relation to an object or a device located in the vehicle, or in relation to another person in the vehicle or outside the vehicle. Gestures may be any motion of one or more part of the user's body that has no meaning such as a gestures performed for users that has Tourette syndrome or motor tics. Gestures may be associated as the user's response to a touch by other person, a behavior or the other person, a gesture of the other person, or an activity of the other person in the car.

In some embodiments, gesture may be performed by a user who may not be the driver of a vehicle. Examples of gestures performed by a user who may not be the driver may include, for example, changing the volume setting of the car stereo, change a mode of multimedia operation, change parameters of the air-conditioner, searching for something in the vehicle, opening vehicle compartments, twist the body position backwards to talk with the passengers in the back (such as talking to the kids in the back), buckling or unbuckling the seat-belt, changing seating position, adjusting the location or position of a seat, opening a window or door, reaching out of the vehicle through the window or door, or passing an object into or out of the vehicle.

Gestures may be in a form of facial expression. A gesture may be performed by muscular activity of facial muscles, whether it is performed as a response to an external trigger (such as squinting or turning away in response to a flash of strong light that may be caused by beam of high-lights from a car on the other direction), or internal trigger by physical or emotional state (such as squinting and moving the head due to laughter or crying). More particular, gestures that may be associated with facial expression may include gestures indicating stress, surprise, fear, focusing, confusion, pain, emotional stress, a string emotional response such as crying.

In some embodiments, gestures may include actions performed by a user in relation to the user's body. Users may include a driver or passengers of a vehicle, when the disclosed embodiments are implemented in a system for detecting gestures in a vehicle. Exemplary gestures or actions in relation to the user's body may include, for example, bringing an object closer to the user's body, touching the user's own body, and fully or partially covering a part of the user's body. Objects may include the user's one or more fingers and user's one or more hands. In other embodiments, objects may be items separate from the user's body. For example, objects may include hand-held objects associated with the user, such as food, cups, eye glasses, sunglasses, hats, pens, phones, other electronic devices, mirrors, bags, and any other object that can be held by the user's fingers and/or hands. Other exemplary gestures may include, for example, bringing a piece of food to the user's mouth, touching the user's hair with the user's fingers, touching the user's eyes with the user's fingers, adjusting the user's glasses, and covering the user's mouth fully and/or partially, or any interaction between an object and the user body, and in specifically face related body parts.

FIG. 1 is a diagram illustrating an example touch-free gesture recognition system 100 that may be used for implementing the disclosed embodiments. System 100 may include, among other things, one or more devices 2, illustrated generically in FIG. 1. Device 2 may be, for example, a personal computer (PC), an entertainment device, a set top box, a television, a mobile game machine, a mobile phone, a tablet computer, an e-reader, a portable game console, a portable computer such as a laptop or ultrabook, a home appliance such as a kitchen appliance, a communication device, an air conditioning thermostat, a docking station, a game machine such as a mobile video gaming device, a digital camera, a watch, an entertainment device, speakers, a Smart Home device, a media player or media system, a location-based device, a pico projector or an embedded projector, a medical device such as a medical display device, a vehicle, an in-car/in-air infotainment system, a navigation system, a wearable device, an augmented reality-enabled device, wearable goggles, a robot, interactive digital signage, a digital kiosk, a vending machine, an automated teller machine (ATM), or any other apparatus that may receive data from a user or output data to a user. Moreover, device 2 may be handheld (e.g., held by a user's hand 19) or non-handheld.

System 100 may include some or all of the following components: a display 4, image sensor 6, keypad 8 comprising one or more keys 10, processor 12, memory device 16, and housing 14. In some embodiments, some or all of the display 4, image sensor 6, keypad 8 comprising one or more keys 10, processor 12, housing 14, and memory device 16, are components of device 2. However, in some embodiments, some or all of the display 4, image sensor 6, keypad 8 comprising one or more keys 10, processor 12, housing 14, and memory device 16, are separate from, but connected to the device 2 (using either a wired or wireless connection). For example, image sensor 6 may be located apart from device 2. Moreover, in some embodiments, components such as, for example, the display 4, keypad 8 comprising one or more keys 10, or housing 14, are omitted from system 100.

A display 4 may include, for example, one or more of a television set, computer monitor, head-mounted display, broadcast reference monitor, a liquid crystal display (LCD) screen, a light-emitting diode (LED) based display, an LED-backlit LCD display, a cathode ray tube (CRT) display, an electroluminescent (ELD) display, an electronic paper/ink display, a plasma display panel, an organic light-emitting diode (OLED) display, thin-film transistor display (TFT), High-Performance Addressing display (HPA), a surface-conduction electron-emitter display, a quantum dot display, an interferometric modulator display, a swept-volume display, a carbon nanotube display, a variforcal mirror display, an emissive volume display, a laser display, a holographic display, a transparent display, a semitransparent display, a light field display, a projector and surface upon which images are projected, or any other electronic device for outputting visual information. In some embodiments, the display 4 is positioned in the touch-free gesture recognition system 100 such that the display 4 is viewable by one or more users.

Image sensor 6 may include, for example, a CCD image sensor, a CMOS image sensor, a camera, a light sensor, an IR sensor, an ultrasonic sensor, a proximity sensor, a short-wave infrared (SWIR) image sensor, a reflectivity sensor, or any other device that is capable of sensing visual characteristics of an environment. Moreover, image sensor 6 may include, for example, a single photosensor or 1-D line sensor capable of scanning an area, a 2-D sensor, or a stereoscopic sensor that includes, for example, a plurality of 2-D image sensors. Image sensor 6 may be associated with a lens for focusing a particular area of light onto the image sensor 6. In some embodiments, image sensor 6 is positioned to capture images of an area associated with at least some display-viewable locations. For example, image sensor 6 may be positioned to capture images of one or more users viewing the display 4. However, a display 4 is not necessarily a part of system 100, and image sensor 6 may be positioned at any location to capture images of a user and/or of device 2.

Image sensor 6 may view, for example, a conical or pyramidal volume of space 18, as indicated by the broken lines in FIG. 1. The image sensor 6 may have a fixed position on the device 2, in which case the viewing space 18 is fixed relative to the device 2, or may be positionably attached to the device 2 or elsewhere, in which case the viewing space 18 may be selectable. Images captured by the image sensor 6 may be digitized by the image sensor 6 and input to the processor 12, or may be input to the processor 12 in analog form and digitized by the processor 12.

Some embodiments may include at least one processor. The at least one processor may include any electric circuit that may be configured to perform a logic operation on at least one input variable, including, for example one or more integrated circuits, microchips, microcontrollers, and microprocessors, which may be all or part of a central processing unit (CPU), a digital signal processor (DSP), a field programmable gate array (FPGA), a graphical processing unit (GPU), or any other circuit known to those skilled in the art that may be suitable for executing instructions or performing logic operations. Multiple functions may be accomplished using a single processor or multiple related and/or unrelated functions may be divide among multiple processors.

In some embodiments, such is illustrated in FIG. 1, at least one processor may include processor 12 connected to memory 16. Memory 16 may include, for example, persistent memory, ROM, EEPROM, EAROM, flash memory devices, magnetic disks, magneto optical disks, CD-ROM, DVD-ROM, Blu-ray, and the like, and may contain instructions (i.e., software or firmware) or other data. Generally, processor 12 may receive instructions and data stored by memory 16. Thus, in some embodiments, processor 12 executes the software or firmware to perform functions by operating on input data and generating output. However, processor 12 may also be, for example, dedicated hardware or an application-specific integrated circuit (ASIC) that performs processes by operating on input data and generating output. Processor 12 may be any combination of dedicated hardware, one or more ASICs, one or more general purpose processors, one or more DSPs, one or more GPUs, or one or more other processors capable of processing digital information.

Figure 2:
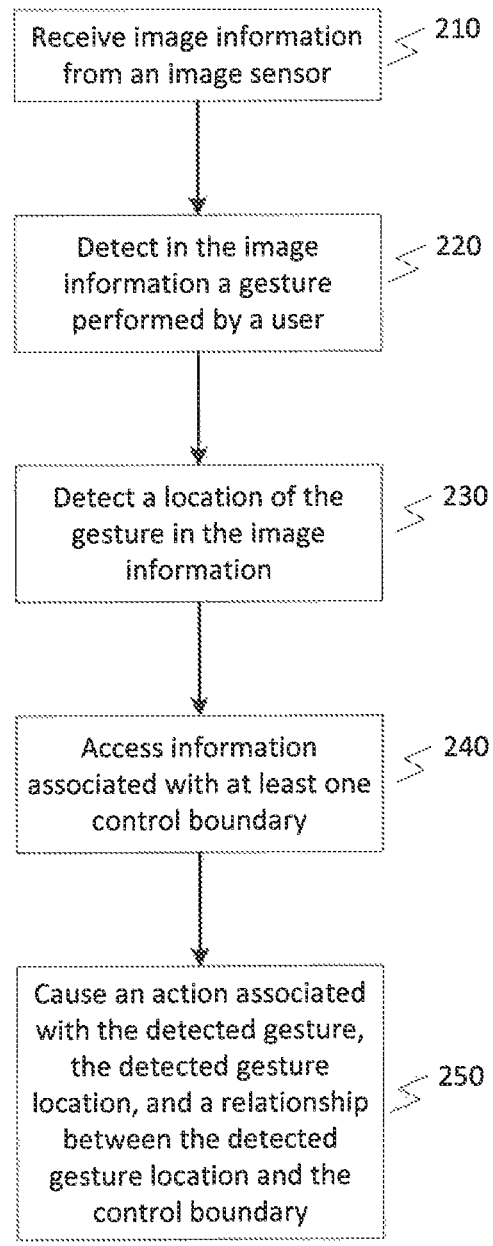
FIG. 2 illustrates example operations that a processor of a touch-free gesture recognition system may be configured to perform, in accordance with some of the disclosed embodiments.

FIG. 2 illustrates exemplary operations 200 that at least one processor may be configured to perform. For example, as discussed above, processor 12 of the touch-free gesture recognition system 100 may be configured to perform these operations by executing software or firmware stored in memory 16, or may be configured to perform these operations using dedicated hardware or one or more ASICs.

In some embodiments, at least one processor may be configured to receive image information from an image sensor (operation 210). In order to reduce data transfer from the image sensor 6 to an embedded device motherboard, general purpose processor, application processor, GPU a processor controlled by the application processor, or any other processor, including, for example, processor 12, the gesture recognition system may be partially or completely be integrated into the image sensor 6. In the case where only partial integration to the image sensor, ISP or image sensor module takes place, image preprocessing, which extracts an object's features related to the predefined object, may be integrated as part of the image sensor, ISP or image sensor module. A mathematical representation of the video/image and/or the object's features may be transferred for further processing on an external CPU via dedicated wire connection or bus. In the case that the whole system is integrated into the image sensor, ISP or image sensor module, only a message or command (including, for example, the messages and commands discussed in more detail above and below) may be sent to an external CPU. Moreover, in some embodiments, if the system incorporates a stereoscopic image sensor, a depth map of the environment may be created by image preprocessing of the video/image in each one of the 2D image sensors or image sensor ISPs and the mathematical representation of the video/image, object's features, and/or other reduced information may be further processed in an external CPU.

"Image information," as used in this application, may be one or more of an analog image captured by image sensor 6, a digital image captured or determined by image sensor 6, subset of the digital or analog image captured by image sensor 6, digital information further processed by an ISP, a mathematical representation or transformation of information associated with data sensed by image sensor 6, frequencies in the image captured by image sensor 6, conceptual information such as presence of objects in the field of view of the image sensor 6, information indicative of the state of the image sensor or its parameters when capturing an image (e.g., exposure, frame rate, resolution of the image, color bit resolution, depth resolution, or field of view of the image sensor), information from other sensors when the image sensor 6 is capturing an image (e.g. proximity sensor information, or accelerometer information), information describing further processing that took place after an image was captured, illumination conditions when an image is captured, features extracted from a digital image by image sensor 6, or any other information associated with data sensed by image sensor 6. Moreover, "image information" may include information associated with static images, motion images (i.e., video), or any other visual-based data.

In some embodiments, the at least one processor may be configured to detect in the image information a gesture performed by a user (operation 220). Moreover, in some embodiments, the at least one processor may be configured to detect a location of the gesture in the image information (operation 230). The gesture may be, for example, a gesture performed by the user using predefined object 24 in the viewing space 16. The predefined object 24 may be, for example, one or more hands, one or more fingers, one or more fingertips, one or more other parts of a hand, or one or more hand-held objects associated with a user. In some embodiments, detection of the gesture is initiated based on detection of a hand at a predefined location or in a predefined pose. For example, detection of a gesture may be initiated if a hand is in a predefined pose and in a predefined location with respect to a control boundary. More particularly, for example, detection of a gesture may be initiated if a hand is in an open-handed pose (e.g., all fingers of the hand away from the palm of the hand) or in a first pose (e.g., all fingers of the hand folded over the palm of the hand). Detection of a gesture may also be initiated if, for example, a hand is detected in a predefined pose while the hand is outside of the control boundary (e.g., for a predefined amount of time), or a predefined gesture is performed in relation to the control boundary. Moreover, for example, detection of a gesture may be initiated based on the user location, as captured by image sensor 6 or other sensors. Moreover, for example, detection of a gesture may be initiated based on a detection of another gesture. E.g., to detect a "left to right" gesture, the processor may first detect a "waving" gesture.

As used in this application, the term "gesture" may refer to, for example, a swiping gesture associated with an object presented on a display, a pinching gesture of two fingers, a pointing gesture towards an object presented on a display, a left-to-right gesture, a right-to-left gesture, an upwards gesture, a downwards gesture, a pushing gesture, a waving gesture, a clapping gesture, a reverse clapping gesture, a gesture of splaying fingers on a hand, a reverse gesture of splaying fingers on a hand, a holding gesture associated with an object presented on a display for a predetermined amount of time, a clicking gesture associated with an object presented on a display, a double clicking gesture, a right clicking gesture, a left clicking gesture, a bottom clicking gesture, a top clicking gesture, a grasping gesture, a gesture towards an object presented on a display from a right side, a gesture towards an object presented on a display from a left side, a gesture passing through an object presented on a display, a blast gesture, a tipping gesture, a clockwise or counterclockwise two-finger grasping gesture over an object presented on a display, a click-drag-release gesture, a gesture sliding an icon such as a volume bar, or any other motion associated with a hand or handheld object. A gesture may be detected in the image information if the processor 12 determines that a particular gesture has been or is being performed by the user.

In some embodiments, a gesture may comprise a swiping motion, a pinching motion of two fingers, pointing, a left to right gesture, a right to left gesture, an upwards gesture, a downwards gesture, a pushing gesture, opening a clenched fist, opening a clenched first and moving towards the image sensor, a tapping gesture, a waving gesture, a clapping gesture, a reverse clapping gesture, closing a hand into a fist, a pinching gesture, a reverse pinching gesture, a gesture of splaying fingers on a hand, a reverse gesture of splaying fingers on a hand, pointing at an activatable object, holding an activating object for a predefined amount of time, clicking on an activatable object, double clicking on an activatable object, clicking from the right side on an activatable object, clicking from the left side on an activatable object, clicking from the bottom on an activatable object, clicking from the top on an activatable object, grasping an activatable object the object, gesturing towards an activatable object the object from the right, gesturing towards an activatable object from the left, passing through an activatable object from the left, pushing the object, clapping, waving over an activatable object, performing a blast gesture, performing a tapping gesture, performing a clockwise or counter clockwise gesture over an activatable object, grasping an activatable object with two fingers, performing a click-drag-release motion, sliding an icon.

Gestures may be any motion of one or more part of the user's body, whether the motion of that one or more part is performed mindfully or not, as an action with a purpose to activate something (such as turn on/off the air-condition) or as a way of expression (such as when people are talking and moving their hands simultaneously, or nodding with their head while listening). Whether the motion of that one or more part of the user's body relates to other part of the user body. Gesture may be associated with addressing a body disturbance, whether the gesture is performed by the user's hand/s or finger/s such as scratching a body part of the user, such as eye, nose, mouth, ear, neck, shoulder. Gesture may be associated with a movement of part of the body such as stretching the neck, the shoulders, the back by different movement of the body, or associated with a movement of all the body such as changing the position of the body. A gesture may be any motion of one or more part of the user's body in relation to an object or a device located in the car, or in relation to other person. Gestures may be any motion of one or more part of the user's body that has no meaning such as a gesture performed for users that has Tourette syndrome or motor tics. Gestures may be associated as a respond to a touch by another person.

Gestures may be in a form of facial expression. Gesture performed by muscular activity of facial muscles, whether it is performed as a respond to external trigger (such as a flash of strong light that may be caused by beam of high-lights from a car on the other direction), or internal trigger by physical or emotional state. More particular, gestures that may be associated with facial expression may include a gesture indicating stress, surprise, fear, focusing, confusion, pain, emotional stress, a string emotional response such as crying.

In some embodiments, gestures may include actions performed by a user in relation to the user's body. Users may include a driver or passengers of a vehicle, when the disclosed embodiments are implemented in a system for detecting gestures in a vehicle. Exemplary gestures or actions in relation to the user's body may include, for example, bringing an object closer to the user's body, touching the user's own body, and fully or partially covering a part of the user's body. Objects may include the user's one or more fingers and user's one or more hands. In other embodiments, objects may be separate from the user. For example, objects may include hand-held objects associated with the user, such as food, cups, eye glasses, sunglasses, hats, pens, phones, other electronic devices, mirrors, bags, and any other object that can be held by the user's fingers and/or hands. Other exemplary gestures may include, for example, bringing a piece of food to the user's mouth, touching the user's hair with the user's fingers, touching the user's eyes with the user's fingers, adjusting the user's glasses, and covering the user's mouth fully and/or partially, or any interaction between an object and the user body, and in specifically face related body parts.

An object associated with the user may be detected in the image information based on, for example, the contour and/or location of an object in the image information. For example, processor 12 may access a filter mask associated with predefined object 24 and apply the filter mask to the image information to determine if the object is present in the image information. That is, for example, the location in the image information most correlated to the filter mask may be determined as the location of the object associated with predefined object 24. Processor 12 may be configured, for example, to detect a gesture based on a single location or based on a plurality of locations over time. Processor 12 may also be configured to access a plurality of different filter masks associated with a plurality of different hand poses. Thus, for example, a filter mask from the plurality of different filter masks that has a best correlation to the image information may cause a determination that the hand pose associated with the filter mask is the hand pose of the predefined object 24. Processor 12 may be configured, for example, to detect a gesture based on a single pose or based on a plurality of poses over time. Moreover, processor 12 may be configured, for example, to detect a gesture based on both the determined one or more locations and the determined one or more poses. Other techniques for detecting real-world objects in image information (e.g., edge matching, greyscale matching, gradient matching, and other image feature-based methods) are well known in the art, and may also be used to detect a gesture in the image information. For example, U.S. Patent Application Publication No. 2012/0092304 and U.S. Patent Application Publication No. 2011/0291925 disclose techniques for performing object detection, both of which are incorporated by reference in their entirety. Each of the above-mentioned gestures may be associated with a control boundary.

A gesture location, as used herein, may refer to one or a plurality of locations associated with a gesture. For example, a gesture location may be a location of an object or gesture in the image information as captured by the image sensor, a location of an object or gesture in the image information in relation to one or more control boundaries, a location of an object or gesture in the 3D space in front of the user, a location of an object or gesture in relation to a device or physical dimension of a device, or a location of an object or gesture in relation to the user body or part of the user body such as the user's head. For example, a "gesture location" may include a set of locations comprising one or more of a starting location of a gesture, intermediate locations of a gesture, and an ending location of a gesture. A processor 12 may detect a location of the gesture in the image information by determining locations on display 4 associated with the gesture or locations in the image information captured by image sensor 6 that are associated with the gesture (e.g., locations in the image information in which the predefined object 24 appears while the gesture is performed). For example, as discussed above, processor 12 may be configured to apply a filter mask to the image information to detect an object associated with predefined object 24. In some embodiments, the location of the object associated with predefined object 24 in the image information may be used as the detected location of the gesture in the image information.

In other embodiments, the location of the object associated with predefined object 24 in the image information may be used to determine a corresponding location on display 4 (including, for example, a virtual location on display 4 that is outside the boundaries of display 4), and the corresponding location on display 4 may be used as the detected location of the gesture in the image information. For example, the gesture may be used to control movement of a cursor, and a gesture associated with a control boundary may be initiated when the cursor is brought to an edge or corner of the control boundary. Thus, for example, a user may extend a finger in front of the device, and the processor may recognize the fingertip, enabling the user to control a cursor. The user may then move the fingertip to the right, for example, until the cursor reaches the right edge of the display. When the cursor reaches the right edge of the display, a visual indication may be displayed indicating to the user that a gesture associated with the right edge is enabled. When the user then performs a gesture to the left, the gesture detected by the processor may be associated with the right edge of the device.

The following are examples of gestures associated with a control boundary:

"Hand-right motion"—the predefined object 24 may move from right to left, from a location which is beyond a right edge of a control boundary, over the right edge, to a location which is to the left of the right edge.

"Hand-left motion"—the predefined object 24 may move from left to right, from a location which is beyond a left edge of a control boundary, over the left edge, to a location which is to the right of the left edge.

"Hand-up motion"—the predefined object 24 may move upwards from a location which is below a bottom edge of a control boundary, over the bottom edge, to a location which is above the bottom edge.

"Hand-down motion"—the predefined object 24 may move downwards from a location which is above a top edge of a control boundary, over the top edge, to a location which is below the top edge.

"Hand-corner up-right"—the predefined object 24 may begin at a location beyond the upper-right corner of the control boundary and move over the upper-right corner to the other side of the control boundary.

"Hand-corner up-left"—the predefined object 24 may begin at a location beyond the upper-left corner of the control boundary and move over the upper-left corner to the other side of the control boundary.

"Hand-corner down-right"—the predefined object 24 may begin at a location beyond the lower-right corner of the control boundary and move over the lower-right corner to the other side of the control boundary.

"Hand-corner down-left"—the predefined object 24 may begin at a location beyond the lower-left corner of the control boundary and move over the lower-left corner to the other side of the control boundary.

Figure 5A:
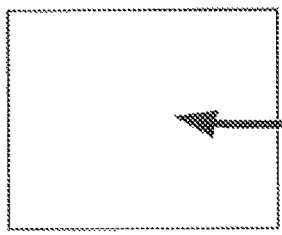
FIGS. 5A-5L illustrate graphical representations of example motion paths that may be associated with touch-free gesture systems and methods consistent with the disclosed embodiments.
Figure 5B:
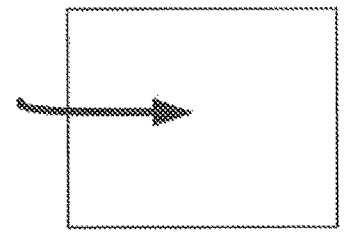
Figure 5C:
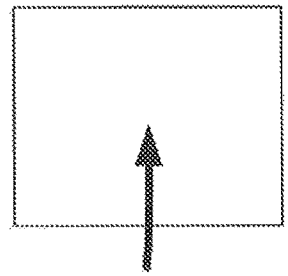
Figure 5D:
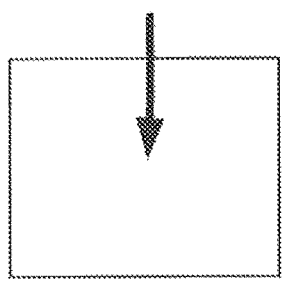
Figure 5E:
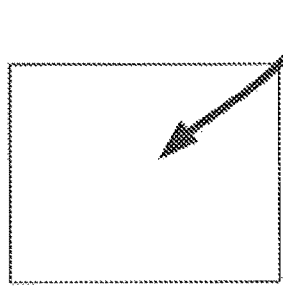
Figure 5F:
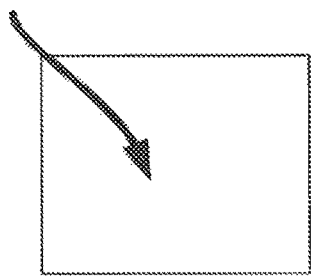
Figure 5G:
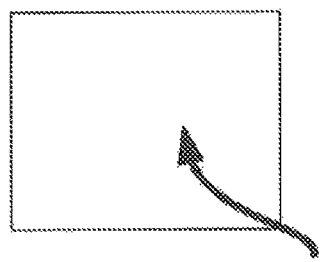
Figure 5H:
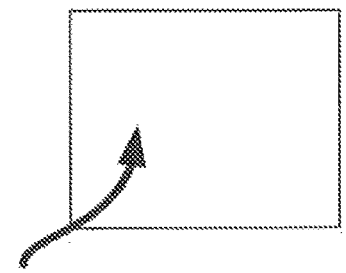
Figure 5I:
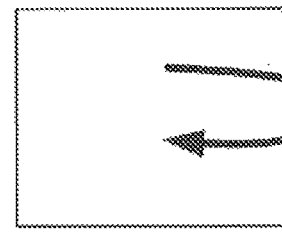
Figure 5J:
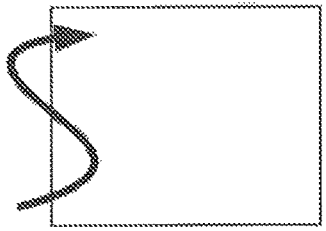
Figure 5K:
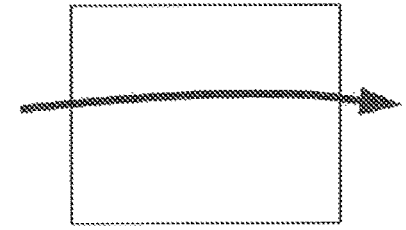
Figure 5L:
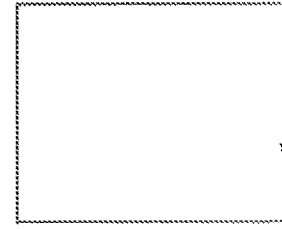
Figure 6:
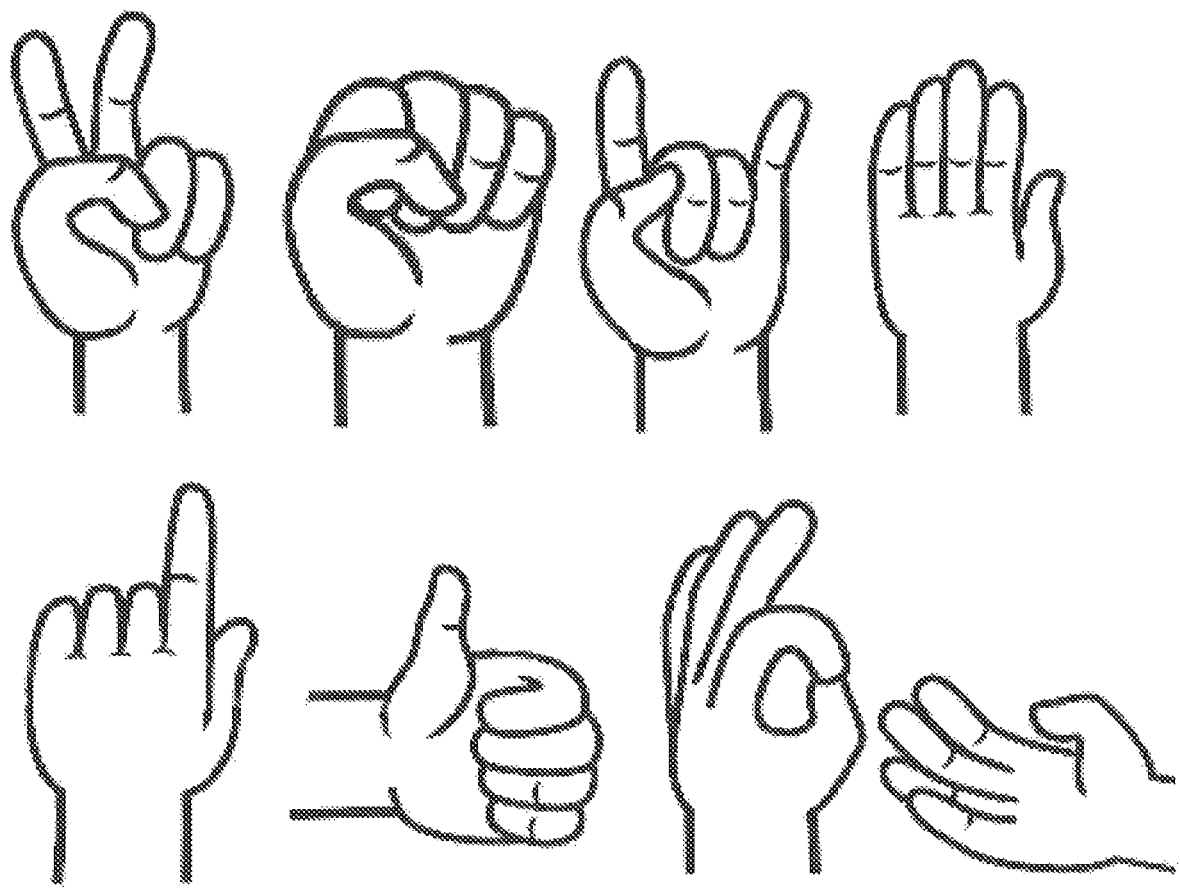
FIG. 6 illustrates a few exemplary hand poses that may be associated with touch-free gesture systems and methods consistent with the disclosed embodiments.

FIGS. 5A-5L depict graphical representations of a few exemplary motion paths (e.g., the illustrated arrows) of gestures, and the gestures' relationship to a control boundary (e.g., the illustrated rectangles). FIG. 6 depicts a few exemplary representations of hand poses that may be used during a gesture, and may affect a type of gesture that is detected and/or action that is caused by a processor. Each differing combination of motion path and gesture may result in a differing action.

In some embodiments, the at least one processor is also configured to access information associated with at least one control boundary, the control boundary relating to a physical dimension of a device in a field of view of the user, or a physical dimension of a body of the user as perceived by the image sensor (operation 240). In some embodiments the processor 12 is configured to generate the information associated with the control boundary prior to accessing the information. However, the information may also, for example, be generated by another device, stored in memory 16, and accessed by processor 12. Accessing information associated with at least one control boundary may include any operation performed by processor 12 in which the information associated with the least one control boundary is acquired by processor 12. For example, the information associated with at least one control boundary may be received by processor 12 from memory 16, may be received by processor 12 from an external device, or may be determined by processor 12.

A control boundary may be determined (e.g., by processor 12 or by another device) in a number of different ways. As discussed above, a control boundary may relate to one or more of a physical dimension of a device, which may, for example, be in a field of view of the user, a physical location of the device, the physical location of the device in relate to the location of the user, physical dimensions of a body as perceived by the image sensor, or a physical location of a user's body or body parts as perceived by the image sensor. A control boundary may be determined from a combination of information related to physical devices located in the physical space where the user performs a gesture and information related to the physical dimensions of the user's body in that the physical space. Moreover, a control boundary may relate to part of a physical device, and location of such part. For example, the location of speakers of a device may be used to determine a control boundary (e.g., the edges and corners of a speaker device), so that if a user performs gestures associated with the control boundary (e.g., a downward gesture along or near the right edge of the control boundary, as depicted, for example, in FIG. 5L), the volume of the speakers may be controlled by the gesture. A control boundary may also relate one or more of a specific location on the device, such as the location of the manufacturer logo, or components on the device. Furthermore, the control boundary may also relate to virtual objects as perceived by the user. Virtual objects may be objects displayed to the user in 3D space in the user's field of view by a 3D display device or by a wearable display device, such as wearable augmented reality glasses. Virtual objects, for example, may include icons, images, video, or any kind of visual information that can be perceived by the user in real or virtual 3D. As used in this application, a physical dimension of a device may include a dimension of a virtual object.

In some embodiments, the control boundary may relate to physical objects or devices located temporarily or permanently in a vehicle. For example, physical objects may include hand-held objects associated with the user, such as bags, sunglasses, mobile devices, tablets, game controller, cups or any object that is not part of the vehicle and is located in the vehicle. Such objects may be considered "temporarily located" in the vehicle because they are not attached to the vehicle and/or can be removed easily by the user. For example, an object "temporarily located" in the vehicle may include a navigation system (Global Positioning System) that can be removed from the vehicle by the user. Physical objects may also include objects associated with the vehicle, such as a multimedia system, steering wheel, shift lever or gear selector, display device, or mirrors located in the vehicle, glove compartment, sun-shade, light controller, air-condition shades, windows, seat, or any interface device in the vehicle that may be controlled or used by the driver or passenger. Such objects may be considered "permanently located" in the vehicle because they are physically integrated in the vehicle, installed, or attached such that they are not easily removable by the user. Alternatively, or additionally, the control boundary may relate to the user's body. For example, the control boundary may relate to various parts of the user's body, including the face, mouth, nose, eyes, hair, lips, neck, ears, or arm of the user. Moreover, the control boundary may also relate to objects or body parts associated with one or more persons proximate the user. For example, the control boundary may relate to other person's body parts, including the face, mouth, nose, eyes, hair, lips, neck, or arm of the other person.

In some embodiments, the at least one processor may be configured to detect the user's gestures in relation to the control boundary determined and identify an activity or behavior associated with the user. For example, the at least one processor may detect movement of one or more physical object (such as a coffee cup or mobile phone) and/or one or more body parts in relation to the control boundary. Based on the movement in relation to the control boundary, the at least one processor may identify or determine the activity or behavior associated with the user. Exemplary activities or user behavior may include, but are not limited to, eating or drinking, touching parts of the face, scratching parts of the face, putting on makeup or fixing makeup, putting on lipstick, looking for sunglasses or eyeglasses, putting on or taking off sunglasses or eyeglasses, changing between sunglasses and eyeglasses, adjusting a position of glasses on the user, yawning, fixing the user's hair, stretching, the user searching their bag or other container, the user or front seat passenger reaching behind the front row to objects in the rear seats, manipulating one or more levers for activating turn signals, a driver turning backward, a driver turning backward to reach for an object, a driver turning backward to reach for an object in a bag, a driver, a driver looking for an item in the glove compartment, adjusting the position or orientation of the side mirrors or main rear-view mirror(s) located in the car, moving one or more hand-held objects associated with the user, operating a hand-held device such as a smartphone or tablet computer, adjusting a seat belt, open or close a seat-belt, modifying in-car parameters such as temperature, air-conditioning, speaker volume, windshield wiper settings, adjusting the car seat position or heating/cooling function, activating a window defrost device to clear fog from windows, manually moving arms and hands to wipe/remove fog or other obstructions from windows, a driver or passenger raising and placing legs on the dashboard, a driver or passenger looking down, a driver or other passengers changing seats, placing a baby in a baby-seat, taking a baby out of a baby-seat, placing a child of a child-seat, taking a child out of a child-seat, or any combination thereof.

In some embodiments, the at least one processor may be configured to detect movement of one or more physical devices, hand-held objects, and/or body parts in relation to the user's body, in order to improve the accuracy in identifying the user's gesture, determined parameters related to driver attentiveness, driver gaze direction and accuracy in executing a corresponding command and/or message. By way of example, if the user is touching the user's eye, the at least one processor may be able to detect that the user's eye in the control boundary is at least partially or fully covered by the user's hand, and determine that the user is scratching the eye. In this scenario, the user may be driving a vehicle and gazing toward the road with the uncovered eye, while scratching the covered eye. Accordingly, the at least one processor may be able to disregard the eye that is being touched and/or at least partially covered, such that the detection of the user's behavior will not be influenced by the covered eye, and the at least one processor may still perform gaze detection based on the uncovered eye.

In some embodiments, the processor may be configured to disregard a particular gesture, behavior, or activity performed by the user for detecting the user's gaze direction, or any change thereof. For example, the detection of the user's gaze by the processor may not be influenced by a detection of the user's finger at least partially covering the user's eye. As such, the at least one processor may be able to avoid false detection of gaze due to the partially covered eye, and accurately identify the user's activity, and/or behavior even if other object and/or body parts are moving, partially covered, or fully covered.

In some embodiments, the processor may be configured to detect the user's gesture in relation to a control boundary associated with a body part of the user in order to improve the accuracy in detecting the user's gesture. As an example, in the event that at least one processor detects that the user's hand or finger crossed a boundary associated with a part of the user body, such as eyes or mouth, the processor may use this information to improve the detection of features associated with the user, features such as head pose or gaze detection. For example, when an object/feature of the user's face is covered partly or fully by the user hand, the processor may ignore detection of that object when extracting information related to the user. In one example, when the user's hand covers fully or partly the user mouth, the processor may use this information and ignore detecting the user's mouth when detecting the user's face to extract the user's head-pose. As another example, when the user's hand cross a boundary associated with the user's eye, the processor may determine that the eye is at least partly covered by the user hand or fingers, and that eye should be ignored when extracting data associated with the user's gaze. In one example, in such event, the gaze detection should be based only on the eye which is not covered. In such an embodiment, the hand, fingers, or other object covering the eye may be detected and ignored, or filtered out of the image information associated with the user's gaze. In another example, when the user finger touches or scratches an area next to the eye, the processor may address to that gesture as "scratching the eye", and therefore the form of the eye will be distorted during the "scratching the eye" gesture. Therefore, that eye should be ignored for gaze detection during the "scratching the eye" gesture. In another example, a set of gestures associated with interaction with the user's face or objects placed on the user face such as glasses, can be considered as gestures indicating that during the period they are performed, the level of attentiveness and alertness of the user is decreased. In one example, the gestures of scratching the eye or fixing glasses' position is considered as distracted gesture, while touching the nose or the beard may be considered as non-distracting gestures.

In other embodiments, the processor may be configured to detect an activity, gesture, or behavior of the user by detecting a location of a body part of the user in relation to a control boundary. For example, the processor may detect an action such as "scratching" the eye, by detecting the user's hand of finger crossed a boundary associated with the user's eye/s. In other embodiments, the processor may be configured to detect an activity, behavior, or gesture of the user by detecting not only a location of a body part of the user in relation to the control boundary, but also a location of an object associated with the gesture. For example, the processor may be configured to detect an activity such as eating, based on a combination of a detection of user's hand crossing a boundary associated with the user's mouth, a detection of an object which is not the user hand but is "connected" to the upper part of the user hand, and a detection of this object moving with the hand at least in the motion of the hand up toward the mouth. In another example, the eating activity is detected as long as the hand is within a boundary associated with the mouth. In another example, the processor detect an eating activity from the moment the hand with an object attached to it crossed the boundary associated with the mouth and the hand moved away from the boundary after a predetermined period of time. In another example, the processor may be required to detect also a gesture performed by the lower part of the user's face, a repeated gesture in which the lower part is moving down and up, or right and left or any combination thereof, in order to identify the user activity as eating.

Figure 3:
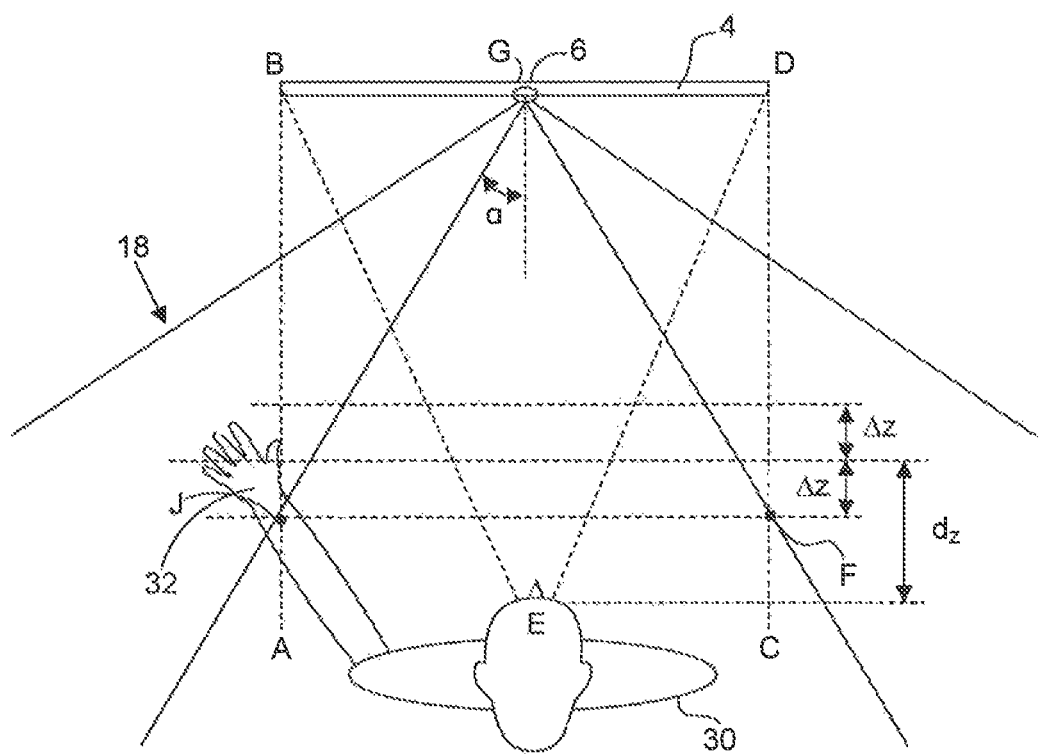
FIG. 3 illustrates an example implementation of a touch-free gesture recognition system in accordance with some of the disclosed embodiments.
Figure 4:
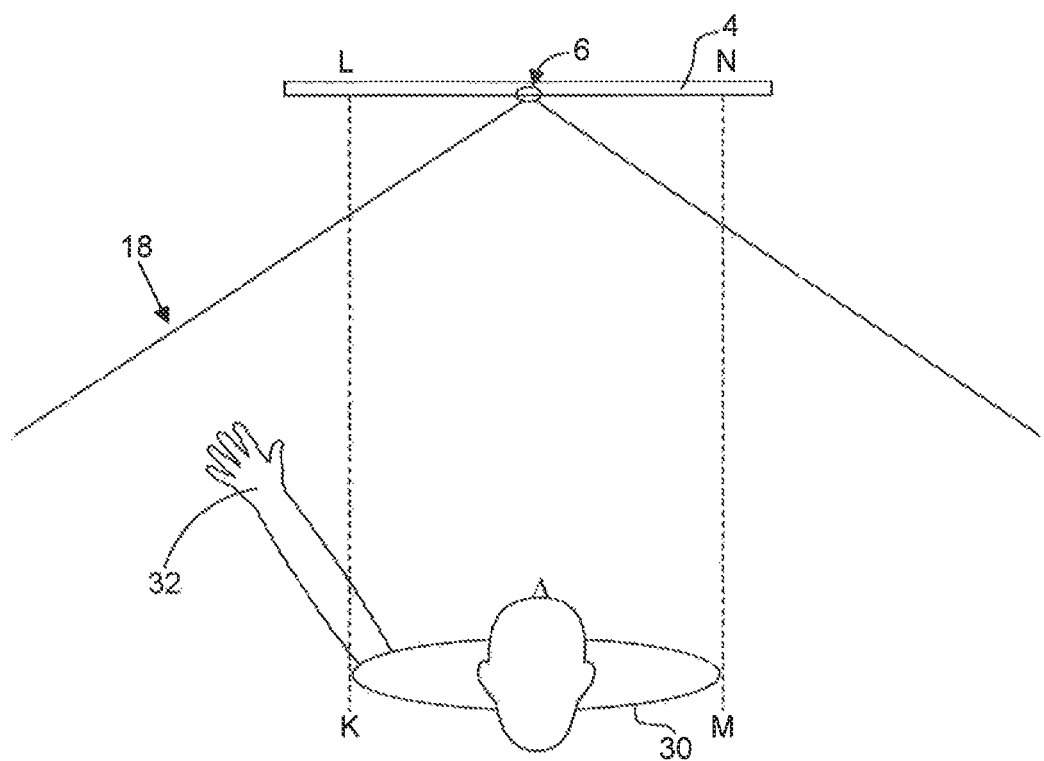
FIG. 4 illustrates another example implementation of a touch-free gesture recognition system in accordance with some of the disclosed embodiments.

FIG. 3 depicts an exemplary implementation of a touch-free gesture recognition system in accordance with some embodiments in which the control boundary may relate to a physical dimension of a device in a field of view of the user. FIG. 4 depicts an exemplary implementation of a touch-free gesture recognition system in accordance with some embodiments in which the control boundary may relate to a physical dimension of a body of the user.

As depicted in the example implementation in FIG. 3, user 30 may view display 4 within the conical or pyramidal volume of space 18 viewable by image sensor 6. In some embodiments, the control boundary relates to broken lines AB and CD, which extend perpendicularly from defined locations on the device, such as, for example, the left and right edges of display 4. For example, as discussed below, the processor 12 may be configured to determine one or more locations in the image information that correspond to lines AB and CD. While only broken lines AB and CD are depicted in FIG. 3, associated with the left and right edges of display 4, in some embodiments the control boundary may additionally or alternatively be associated with the top and bottom edges of display 4, or some other physical dimension of the display, such as a border, bevel, or frame of the display, or a reference presented on the display. Moreover, while the control boundary may be determined based on the physical dimensions or other aspects of display 4, the control boundary may also be determined based on the physical dimensions of any other device (e.g., the boundaries or contour of a stationary object).

The processor 12 may be configured to determine the location and distance of the user from the display 4. For example, the processor 12 may use information from a proximity sensor, a depth sensing sensor, information representative of a 3D map in front of the device, or use face detection to determine the location and distance of the user from the display 4, and from the location and distance compute a field of view (FOV) of the user. For example, an inter-pupillary distance in the image information may be measured and used to determine the location and distance of the user from the display 4. For example, the processor may be configured to compare the inter-pupillary distance in the image information to a known or determined inter-pupillary distance associated with the user, and determine a distance based on the difference (as the user stands further from image sensor 6, the inter-pupillary distance in the image information may decrease). The accuracy of the user distance determination may be improved by utilizing the user's age, since, for example, a younger user may have a smaller inter-pupillary distance. Face recognition may also be applied to identify the user and retrieve information related to the identified user. For example, an Internet social medium (e.g., Facebook) may be accessed to obtain information about the user (e.g., age, pictures, interests, etc.). This information may be used to improve the accuracy of the inter-pupillary distance, and thus improve the accuracy of the distance calculation of the user from the screen.

The processor 12 may also be configured to determine an average distance dz in front of the user's eyes that the user positions the predefined object 24 when performing a gesture. The average distance dz may depend on the physical dimensions of the user (e.g., the length of the user's forearm), which can be estimated, for example, from the user's inter-pupillary distance. A range of distances (e.g., dz+Δz through dz−Δz) surrounding the average distance dz may also be determined. During the performance of a gesture, the predefined object 24 may often be found at a distance in the interval between dz+Δz to dz−Δz. In some embodiments, Δz may be predefined. Alternatively, Δz may be calculated as a fixed fraction (e.g., 0.2) of dz. As depicted in FIG. 3, broken line FJ substantially parallel to the display 4 at a distance dz−Δz from the user may intersect the broken lines AB and CD at points F and J. Points F and J may be representative of a region of the viewing space of the image sensor 6 having semi-apical angle $a$, indicated by the broken lines GJ and GF, which serve to determine the control boundary. Thus, for example, if the user's hand 32 is outside of the region bounded by the lines GJ and GF, the hand 32 may be considered to be outside the control boundary. Thus, in some embodiments, the information associated with the control boundary may be, for example, the locations of lines GJ and GF in the image information, or information from which the locations of lines GJ and GF in the image information can be determined.

Alternatively or additionally, in some embodiments, at least one processor is configured to determine the control boundary based, at least in part, on a dimension of the device (e.g., display 4) as is expected to be perceived by the user. For example, broken lines BE and BD in FIG. 3, which extend from a location on or near the body of the user (determined, for example, based on the distance from the image sensor 6 to the user, the location of the user's face or eyes, and/or the FOV of the user) to the left and right edges of display 4, are representative of dimensions of display 4 as is expected to be perceived by the user. That is, based on the distance and orientation of the user relative to the display 4, the processor may be configured to determine how the display is likely perceived from the vantage point of the user. (E.g., by determining sight lines from the user to the edges of the display.) Thus, the processor may be configured to determine the control boundary by determining one or more locations in the image information that correspond to lines BE and BD (e.g., based on an analysis of the average distance from the user's body that the user positions the predefined object 24). While only broken lines BE and BD are depicted in FIG. 3, associated with the left and right edges of display 4, in some embodiments the control boundary may additionally or alternatively be associated with the top and bottom edges of display 4.

Alternatively or additionally, the control boundary may relate to a physical dimension of a body of the user as perceived by the image sensor. That is, based on the distance and/or orientation of the user relative to the display or image sensor, the processor may be configured to determine a control boundary. The farther the user from the display, the smaller the image sensor's perception of the user, and the smaller an area bounded by the control boundaries. The processor may be configured to identify specific portions of a user's body for purposes of control boundary determination. Thus the control boundary may relate to the physical dimensions of the user's torso, shoulders, head, hand, or any other portion or portions of the user's body. The control boundary may be related to the physical dimension of a body portion by either relying on the actual or approximate dimension of the body portion, or by otherwise using the body portion as a reference for setting control boundaries. (E.g., a control boundary may be set a predetermined distance from a reference location on the body portion.)

The processor 12 may be configured to determine a contour of a portion of a body of the user (e.g., a torso of the user) in the image information received from image sensor 6. Moreover, the processor 12 may be configured to determine, for example, an area bounding the user (e.g., a bounding box surrounding the entire user or the torso of the user). For example, the broken lines KL and MN depicted in FIG. 4 are associated with the left and right sides of a contour or area bounding the user. The processor 12 may be configured to determine the control boundary by determining one or more locations in the image information that correspond to the determined contour or bounding area. Thus, for example, the processor 12 may be configured to determine the control boundary by detecting a portion of a body of the user, other than the user's hand (e.g., a torso), and to define the control boundary based on the detected body portion. While only broken lines associated with the left and right sides of the user are depicted in FIG. 4, in some embodiments the control boundary may additionally or alternatively be associated with the top and bottom of the contour or bounding area.

In some embodiments, the at least on processor may be configured to cause a visual or audio indication when the control boundary is crossed. For example, if an object in the image information associated with predefined object 24 crosses the control boundary, this indication may inform the user that a gesture performed within a predefined amount of time will be interpreted as gesture associated with the control boundary. For example, if an edge of the control boundary is crossed, an icon may begin to fade-in on display 4. If the gesture is completed within the predefined amount of time, the icon may be finalized; if the gesture is not completed within the predefined amount of time, the icon may no longer be presented on display 4.

While a control boundary is discussed above with respect to a single user, the same control boundary may be associated with a plurality of users. For example, when a gesture performed by one user is detected, a control boundary may be accessed that was determined for another user, or that was determined for a plurality of users. Moreover, the control boundary may be determined based on an estimated location of a user, without actually determining the location of the user.

In some embodiments, the at least one processor is also configured to cause an action associated with the detected gesture, the detected gesture location, and a relationship between the detected gesture location and the control boundary (operation 250). As discussed above, an action caused by a processor may be, for example, generation of a message or execution of a command associated with the gesture. A message or command may be, for example, addressed to one or more operating systems, one or more services, one or more applications, one or more devices, one or more remote applications, one or more remote services, or one or more remote devices. In some embodiments, the action includes an output to a user. For example, the action may provide an indication to a user that some event has occurred. The indication may be, for example, visual (e.g., using display 4), audio, tactile, ultrasonic, or haptic. An indication may be, for example, an icon presented on a display, change of an icon presented on a display, a change in color of an icon presented on a display, an indication light, an indicator moving on a display, a directional vibration indication, or an air tactile indication. Moreover, for example, the indicator may appear on top of all other images appearing on the display.

In some embodiments, memory 16 stores data (e.g., a look-up table) that provides, for one or more predefined gestures and/or gesture locations, one or more corresponding actions to be performed by the processor 12. Each gesture that is associated with a control boundary may be characterized by one or more of the following factors: the starting point of the gesture, the motion path of the gesture (e.g., a semicircular movement, a back and forth movement, an "S"-like path, or a triangular movement), the specific edges or corners of the control boundary crossed by the path, the number of times an edge or corner of the control boundary is crossed by the path, and where the path crosses edges or corners of the control boundary. By way of example only, a gesture associated with a right edge of a control boundary may toggle a charm menu, a gesture associated with a top edge of a control boundary or bottom edge of a control boundary may toggle an application command, a gesture associated with a left edge of a control boundary may switch to a last application, and a gesture associated with both a right edge and a left edge of a control boundary (e.g., as depicted in FIG. 5K) may select an application or start menu. As an additional example, if a gesture crosses a right edge of a control boundary, an image of a virtual page may progressively cross leftward over the right edge of the display so that the virtual page is progressively displayed on the display; the more the predefined object associated with the user is moved away from the right edge of the screen, the more the virtual page is displayed on the screen.

For example, processor 12 may be configured to cause a first action when the gesture is detected crossing the control boundary, and to cause a second action when the gesture is detected within the control boundary. That is, the same gesture may result in a different action based on whether the gesture crosses the control boundary. For example, a user may perform a right-to-left gesture. If the right-to-left gesture is detected entirely within the control boundary, the processor may be configured, for example, to shift a portion of the image presented on display 4 to the left (e.g., a user may use the right-to-left gesture to move a photograph presented on display 4 in a leftward direction). If, however, the right-to-left gesture is detected to cross the right edge of the control boundary, the processor may be configured, by way of example only, to replace the image presented on display 4 with another image (e.g., a user may use the right-to-left gesture to scroll through photographs in a photo album).

Moreover, for example, the processor 12 may be configured to distinguish between a plurality of predefined gestures to cause a plurality of actions, each associated with a differing predefined gesture. For example, if differing hand poses cross the control boundary at the same location, the processor may cause differing actions. For example, a pointing finger crossing the control boundary may cause a first action, while an open hand crossing the control boundary may cause a differing second action. As an alternative example, if a user performs a right-to-left gesture that is detected to cross the right edge of the control boundary, the processor may cause a first action, but crossing the control boundary in the same location with the same hand pose, but from a different direction, may cause a second action. As another example, a gesture performed in a first speed may cause a first action; the same gesture, when performed in second speed, may cause a second action. As another example, a left-to-right gesture performed in a first motion path representative of the predefined object (e.g., the user's hand) moving a first distance (e.g. 10 cm) may cause a first action; the same gesture performed in a second motion path representative of the predefined object moving a second distance (e.g. 30 cm) may cause a second action The first and second actions could be any message or command. By way of example only, the first action may replace the image presented on display 4 with a previously viewed image, while the second action may cause a new image to be displayed.

Moreover, for example, the processor 12 may be configured to generate a plurality of actions, each associated with a differing relative position of the gesture location to the control boundary. For example, if a first gesture (e.g. left to right gesture) crosses a control boundary near the control boundary top, the processor may be configured to generate a first action, while if the same first gesture, crosses the control boundary near the control boundary bottom, the processor may be configured to generate a second action. Another example, if a gesture that crosses the control boundary begins at a location outside of the control boundary by more than a predetermined distance, the processor may be configured to generate a first action. However, if a gesture that crosses the control boundary begins at a location outside of the control boundary by less than a predetermined distance, the processor may be configured to generate a second action. By way of example only, the first action may cause an application to shut down while the second action may close a window of the application.

Moreover, for example, the action may be associated with a predefined motion path associated with the gesture location and the control boundary. For example, memory 16 may store a plurality of differing motion paths, with each detected path causing a differing action. A predefined motion path may include a set of directions of a gesture (e.g., left, right, up down, left-up, left-down, right-up, or right-down) in a chronological sequence. Or, a predefined motion path may be one that crosses multiple boundaries (e.g., slicing a corner or slicing across entire display), or one that crosses a boundary in a specific region (e.g., crosses top right).

A predefined motion path may also include motions associated with a boundary, but which do not necessarily cross a boundary. (E.g., up down motion outside right boundary; up down motion within right boundary).

Moreover, a predefined motion path may be defined by a series of motions that change direction in a specific chronological sequence. (E.g., a first action may be caused by down-up, left right; while a second action may be caused by up-down, left-right).

Moreover, a predefined motion path may be defined by one or more of the starting point of the gesture, the motion path of the gesture (e.g., a semicircular movement, a back and forth movement, an "S"-like path, or a triangular movement), the specific edges or corners of the control boundary crossed by the path, the number of times an edge or corner of the control boundary is crossed by the path, and where the path crosses edges or corners of the control boundary.

In some embodiments, as discussed above, the processor may be configured to determine the control boundary by detecting a portion of a body of the user, other than the user's hand (e.g., a torso), and to define the control boundary based on the detected body portion. In some embodiments, the processor may further be configured to generate the action based, at least in part, on an identity of the gesture, and a relative location of the gesture to the control boundary. Each different predefined gesture (e.g., hand pose) may have a differing identity. Moreover, a gesture may be performed at different relative locations to the control boundary, enabling each different combination of gesture/movement relative to the control boundary to cause a differing action.

In addition, the processor 12 may be configured to perform different actions based on the number of times a control boundary is crossed or a length of the path of the gesture relative to the physical dimensions of the user's body. For example, an action may be caused by the processor based on a number of times that each edge or corner of the control boundary is crossed by a path of a gesture. By way of another example, a first action may be caused by the processor if a gesture, having a first length, is performed by a first user of a first height. The first action may also be caused by the processor if a gesture, having a second length, is performed by a second user of a second height, if the second length as compared to the second height is substantially the same as the first length as compared to the first height. In this example scenario, the processor may cause a second action if a gesture, having the second length, is performed by the first user.

The processor 12 may be configured to cause a variety of actions for gestures associated with a control boundary. For example, in addition to the examples discussed above, the processor 12 may be configured to activate a toolbar presented on display 4, which is associated with a particular edge of the control boundary, based on the gesture location. That is, for example, if it is determined that the gesture crosses a right edge of the control boundary, a toolbar may be displayed along the right edge of display 4. Additionally, for example, the processor 12 may be configured to cause an image to be presented on display 4 based on the gesture, the gesture location, and the control boundary (e.g., an edge crossed by the gesture).

By configuring a processor to cause an action associated with a detected gesture, the detected gesture location, and a relationship between the detected gesture location and a control boundary, a more robust number of types of touch-free gestures by a user can be performed and detected. Moreover, touch-free gestures associated with a control boundary may increase the usability of a device that permits touch-free gestures to input data or control operation of the device.

Certain features which, for clarity, are described in this specification in the context of separate embodiments, may also be provided in combination in a single embodiment. Conversely, various features which, for brevity, are described in the context of a single embodiment, may also be provided in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Exemplary embodiments have been described. Other embodiments are within the scope of the following claims. The disclosed embodiments are also described by the following numbered paragraphs:

1. A touch-free gesture recognition system, comprising: at least one processor configured to: receive image information from an image sensor; detect in the image information a gesture performed by a user; detect a location of the gesture in the image information; access information associated with at least one control boundary, the control boundary relating to a physical dimension of a device in a field of view of the user, or a physical dimension of a body of the user as perceived by the image sensor; and cause an action associated with the detected gesture, the detected gesture location, and a relationship between the detected gesture location and the control boundary.

2. The system of paragraph 1, wherein the processor is further configured to generate information associated with at least one control boundary prior to accessing the information.

3. The system of paragraph 1, wherein the processor is further configured to determine the control boundary based, at least in part, on a dimension of the device as is expected to be perceived by the user.

4. The system of paragraph 3, wherein the control boundary is determined based, at least in part, on at least one of an edge or corner of the device as is expected to be perceived by the user.

5. The system of paragraph 1, wherein the processor is further configured to distinguish between a plurality of predefined gestures to cause a plurality of actions, each associated with a differing predefined gesture.

6. The system of paragraph 1, wherein the processor is further configured to generate a plurality of actions, each associated with a differing relative position of the gesture location to the control boundary.

7. The system of paragraph 1, wherein the processor is further configured to determine the control boundary by detecting a portion of a body of the user, other than the user's hand, and to define the control boundary based on the detected body portion, and wherein the processor is further configured to generate the action based, at least in part, on an identity of the gesture, and a relative location of the gesture to the control boundary.

8. The system of paragraph 1, wherein the processor is further configured to determine the control boundary based on a contour of at least a portion of a body of the user in the image information.

9. The system of paragraph 1, wherein the device includes a display, and wherein the processor is further configured to determine the control boundary based on dimensions of the display.

10. The system of paragraph 9, wherein processor is further configured to determine the control boundary based on at least one of an edge or corner of a display associated with the device.

11. The system of paragraph 9, wherein the processor is further configured to activate a toolbar associated with a particular-edge based, at least in part, on the gesture location.

12. The system of paragraph 1, wherein the action is related to a number of times at least one of an edge or corner of the control boundary is crossed by a path of the gesture.

13. The system of paragraph 1, wherein the action is associated with a predefined motion path associated with the gesture location and the control boundary.

14. The system of paragraph 1, wherein the action is associated with a predefined motion path associated with particular edges or corners crossed by the gesture location.

15. The system of paragraph 1, wherein the processor is further configured to detect a hand in predefined location relating to the control boundary and initiate detection of the gesture based on the detection of the hand at the predefined location.

16. The system of paragraph 1, wherein the processor is further configured to cause at least one of a visual or audio indication when the control boundary is crossed.

17. The system of paragraph 1, wherein the control boundary is determined, at least in part, based on a distance between the user and the image sensor.

18. The system of paragraph 1, wherein the control boundary is determined, at least in part, based on a location of the user in relation to the device.

19. A method for a touch-free gesture recognition system, comprising: receiving image information from an image sensor; detecting in the image information a gesture performed by a user; detecting a location of the gesture in the image information; accessing information associated with at least one control boundary, the control boundary relating to a physical dimension of a device in a field of view of the user, or a physical dimension of a body of the user as perceived by the image sensor; causing an action associated with the detected gesture, the detected gesture location, and a relationship between the detected gesture location and the control boundary.

20. The method of paragraph 19, further comprising determining the control boundary based on a dimension of the device as is expected to be perceived by the user.

21. The method of paragraph 20, wherein the control boundary is determined based, at least in part, on at least one of an edge or corner of the device as is expected to be perceived by the user.

22. The method of paragraph 19, further comprising generating a plurality of actions, each associated with a differing relative position of the gesture location to the control boundary.

23. The method of paragraph 19, further comprising determining the control boundary by detecting a portion of a body of the user, other than the user's hand, and defining the control boundary based on the detected body portion, and generating the action based, at least in part, on an identity of the gesture, and a relative location of the gesture to the control boundary.

24. The method of paragraph 19, further comprising determining the control boundary based on dimensions of the display.

25. The method of paragraph 24, further comprising activating a toolbar associated with a particular edge based, at least in part, on the gesture location.

26. The method of paragraph 19, wherein the control boundary is determined based on at least one of an edge or a corner of the device.

27. The method of paragraph 19, wherein the action is associated with a predefined motion path associated with the gesture location and the control boundary.

28. The method of paragraph 19, wherein the action is associated with a predefined motion path associated with particular edges or corners crossed by the gesture location.

29. The method of paragraph 19, further comprising detecting a hand in predefined location relating to the control boundary and initiating detection of the gesture based on the detection of the hand at the predefined location 30. The method of paragraph 19, wherein the control boundary is determined, at least in part, based on a distance between the user and the image sensor.

31. A touch-free gesture recognition system, comprising: at least one processor configured to: receive image information associated with a user from an image sensor; access information associated with a control boundary relating to a physical dimension of a device in a field of view of the user, or a physical dimension of a body of the user as perceived by the image sensor; detect in the image information a gesture performed by a user in relation to the control boundary; identify a user behavior based on the detected gesture; and generate a message or a command based on the identified user behavior.

32. The system of paragraph 31, wherein the at least one processor is further configured to detect the gesture by detecting a movement of at least one of a device, an object, or a body part relative to a body of the user.

33. The system of paragraph 32, wherein the predicted user behavior includes prediction of one or more activity the user performs simultaneously.

34. The system of paragraph 33, wherein the predicted one or more activity the user performs includes reaching for a mobile device, operate a mobile device, operate an application, controlling a multimedia device in the vehicle.

35. The system of paragraph 32, wherein the at least one processor is further configured to determine at least one of a level of attentiveness of the user or a gaze direction of the user based on the detected movement of at least one of the device, the object, or the body part relative to the body of the user.

36. The system of paragraph 32, wherein the at least one processor is further configured to improve an accuracy in detecting the gesture performed by the user or generating the message or the command, based on the detected movement of at least one of the device, the object, or the body part relative to the body of the user.

37. The system of paragraph 32, wherein the detected gesture performed by the user is associated with an interaction with a face of the user.

38. The system of paragraph 37, wherein the interaction comprises placing an object on the face of the user, or touching the face of the user.

39. The system of paragraph 31, wherein the at least one processor is further configured to: detect, in the image information, an object in a boundary associated with at least a part of a body of the user; ignore the detected object in the image information; and detect, based on the image information other than the ignored detected object, at least one of the gesture performed by the user, the user behavior, a gaze of the user, or an activity of the user.

40. The system of paragraph 39, wherein the detected object comprises a finger or a hand of the user.

41. The system of paragraph 31, wherein the at least one processor is further configured to: detect a hand of the user in a boundary associated with a part of a body of the user; detect an object in the hand of the user, wherein the object is moving with the hand toward the part of the body of the user; and identify the user behavior based on the detected hand and the detected object in the boundary associated with the part of the body of the user.

42. The system of paragraph 31, wherein the at least one processor is further configured to: detect a hand of the user in a boundary associated with a part of a body of the user; detect an object in the hand of the user; detect the hand of the user moving away from the boundary associated with the part of the body of the user after a predetermined period of time; and identify the user behavior based on the detected hand and the detected object.

43. The system of paragraph 31, wherein the at least one processor is further configured to: determine that the gesture performed by the user is an eating gesture by determining that the gesture is a repeated gesture in a lower portion of the user's face, in which the lower portion of the user's face moves up and down, left and right, or a combination thereof.

44. A touch-free gesture recognition system, comprising: at least one processor configured to: receive image information from an image sensor; detect in the image information a gesture performed by a user; detect a location of the gesture in the image information; access information associated with a control boundary, the control boundary relating to a physical dimension of a device in a field of view of the user, or a physical dimension of a body of the user as perceived by the image sensor; predict a user behavior, based on at least one of the detected gesture, the detected gesture location, or a relationship between the detected gesture location and the control boundary; and generate a message or a command based on the predicted user behavior.

45. The system of paragraph 44, wherein the at least one processor is configured to predict the user behavior using a machine learning algorithm.

46. The system of paragraph 44, wherein the at least one processor is further configured to predict an intention of the user to perform a particular gesture or activity by: detecting a movement patterns within a sequence of the received image information; and correlating, using a machine learning algorithm, the detected movement pattern to the intention of the user to perform the particular gesture.

47. The system of paragraph 44, wherein the user is located in a vehicle, and wherein the at least one processor is further configured to predict an intention of the user to perform a particular gesture by: receiving sensor information from a second sensor associated with the vehicle; detecting a pattern within a sequence of the received sensor information; and correlating, using a machine learning algorithm, the sensor information to one or more detected gesture or activity the user performs.

48. The system of paragraph 47, wherein the received sensor information is indicative of a location of a body part of the user in a three-dimensional space, or a movement vector of a body part of the user.

49. The system of paragraph 47, wherein the second sensor associated with the vehicle of the user comprises a light sensor, an infrared sensor, an ultrasonic sensor, a proximity sensor, a reflectivity sensor, a photosensor, an accelerometer, or a pressure sensor.

50. The system of paragraph 44, wherein the at least one processor is configured to predict the user behavior based on the control boundary and at least one of the detected gesture, the detected gesture location, or the relationship between the detected gesture location and the control boundary.

51. The system of paragraph 50, wherein the at least one processor is further configured to correlate, using a machine learning algorithm, the received sensor information to the intention of the user to perform at least one of the particular gesture or the activity.

52. The system of paragraph 50, wherein the received sensor information is data related to an environment in which the user is located.

53. The system of paragraph 44, wherein the at least one processor is further configured to: receive, from a second sensor, data associated with a vehicle of the user, the data associated with the vehicle of the user comprising at least one of speed, acceleration, rotation, movement, operating status, or active application associated with the vehicle; and generate a message or a command based on at least one of the data associated with the vehicle and the predicted user behavior.

54. The system of paragraph 44, wherein the at least one processor is further configured to: receive data associated with at least one of past predicted events or forecasted events, the at least one of past predicted events or forecasted events being associated with actions, gestures, or behavior of the user; and generate a message or a command based on at least the received data.

55. The system of paragraph 44, wherein the user is located in a vehicle, and the at least one processor is further configured to: receive, from a second sensor, data associated with a speed of the vehicle, an acceleration of the vehicle, a rotation of the vehicle, a movement of the vehicle, an operating status of the vehicle, or an active application associated with the vehicle; and predict the user behavior, an intention to perform a gesture, or an intention to perform an activity using the received data from the second sensor.

56. The system of paragraph 44, wherein the at least one processor is further configured to: receive data associated with at least one of past predicted events or forecasted events, the at least one of past predicted events or forecasted events being associated with actions, gestures, or behavior of the user; and predict at least one of the user behavior, an intention to perform a gesture, or an intention to perform an activity based on the received data.

57. The system of paragraph 44, wherein the at least one processor is further configured to predict the user behavior, based on detecting and classifying the gesture in relation to at least one of the body of the user, a face of the user, or an object proximate the user.

58. The system of paragraph 57, wherein the at least one processor is further configured to predict at least one of the user behavior, user activity, or level of attentiveness to the road, based on detecting and classifying the gesture in relation to at least one of the body of the user or the object proximate the user.

59. The system of paragraph 57, wherein the at least one processor is further configured to predict the user behavior, the user activity, or the level of attentiveness to the road, based on detecting a gesture performed by a user toward a mobile device or an application running on a digital device.

60. The system of paragraph 44, wherein the predicted user behavior further comprises at least one of the user performing a particular activity, the user being involved in a plurality of activities simultaneously, a level of attentiveness, a level of attentiveness to the road, a level of awareness, or an emotional response of the user.

61. The system of paragraph 60, wherein the attentiveness of the user to the road is predicted by detecting at least one of a gesture performed by the user toward a mirror in a car or a gestured performed by the user to fix the side mirrors.

62. The system of paragraph 44, wherein the at least one processor is further configured to predict a change in a gaze direction of the user before, during, and after the gesture performed by the user, based on a correlation between the detected gesture and the predicted change in gaze direction of the user.

63. The system of paragraph 44, wherein the at least one processor is further configured to: receive, from a second sensor, data associated with a vehicle of the user, the data associated with the vehicle of the user comprising at least one of speed, acceleration, rotation, movement, operating status, or active application associated with the vehicle; and change an operation mode of the vehicle based on the received data.

64. The system of paragraph 63, wherein the at least one processor is further configured to detect a level of attentiveness of the user to the road during the change in operation mode of the vehicle by: detecting at least one of a behavior or an activity of the user before the change in operation mode and during the change in operation mode.

65. The system of paragraph 64, wherein the change in operation mode of the vehicle comprises changing between a manual driving mode and an autonomous driving mode.

66. The system of paragraph 44, wherein the at least one processor is further configured to predict the user behavior using information associated with the detected gesture performed by the user, the information comprising at least one of speed, smoothness, direction, motion path, continuity, location, or size.

67. A touch-free gesture recognition system, comprising: at least one processor configured to: receive image information from an image sensor; detect in the image information at least one of a gesture or an activity performed by the user; and predict a change in gaze direction of the user before, during, and after at least one of the gesture or the activity is performed by the user, based on a correlation between at least one of the detected gesture or the detected activity, and the change in gaze direction of the user.

68. The system of paragraph 67, wherein the at least one processor is further configured to predict the change in the gaze direction of the user based on historical information associated with a previous occurrence of the gesture, the activity, or a behavior of the user, wherein the historical information indicates a previously determined direction of gaze of the user before, during, and after the associated gesture, activity, or behavior of the user.

69. The system of paragraph 67, wherein the at least one processor is further configured to predict the change in the gaze direction of the user using information associated with features of the detected gesture or the detected activity performed by the user.

70. The system of paragraph 69, wherein the information associated with features of the detected gesture or the detected activity are indicative of a speed, a smoothness, a direction, a motion path, a continuity, a location, or a size of the detected gesture or detected activity.

71. The system of paragraph 70, wherein the information associated with features of the detected gesture or the detected activity are associated with a hand of the user, a finger of the user, a body part of the user, or an object moved by the user.

72. The system of paragraph 71, wherein the at least one processor is further configured to predict the change in the gaze direction of the user based on a detection of an activity performed by the user, behavior associated with a passenger, or interaction between the user and the passenger.

73. The system of paragraph 67, wherein the user is located in a vehicle, and the at least one processor is further configured to predict the change in gaze direction of the user based on detection of at least one of a level of attentiveness of the user to the road, or an event taking place within the vehicle.

74. The system of paragraph 67, wherein the user is located in a vehicle, and the at least one processor is further configured to predict the change in gaze direction of the user based on: a detection of a level of attentiveness of the user to the road, and a detection of at least one of the gesture performed by the user, an activity performed by the user, a behavior of the user, or an event taking place within a vehicle.

75. The system of paragraph 67, wherein the at least one processor is further configured to predict a level of attentiveness of the user by: receiving gesture information associated with a gesture of the user while operating a vehicle; correlating the received information with event information about an event associated with the vehicle; correlating the gesture information and event information with a level of attentiveness of the user; and predicting the level of attentiveness of the user based on subsequent detection of the event and the gesture.

76. The system of paragraph 67, wherein the at least one processor is further configured to predict the change in the gaze direction of the user based on information associated with the gesture performed by the user, wherein the information comprises at least one of a frequency of the gesture, location of the gesture in relation to a body part of the user, or location of the gesture in relation to an object proximate the user in a vehicle.

77. The system of paragraph 67, wherein the at least one processor is further configured to correlate at least one of the gesture performed by the user, a location of the gesture, a nature of the gesture, or features associated with the gesture to a behavior of the user.

78. The system of paragraph 67, wherein: the user is a driver of a vehicle, and the at least one processor is further configured to correlate the gesture performed by the user to a response time of the user to an event associated with the vehicle.

79. The system of paragraph 78, wherein the response time of the user comprises a response time of the user to a transitioning of an operation mode of the vehicle.

80. The system of paragraph 79, wherein the transitioning of the operation mode of the vehicle comprises changing from an autonomous driving mode to a manual driving mode.

81. The system of paragraph 67, wherein: the user is a passenger of a vehicle, and the at least one processor is further configured to: correlate the gesture performed by the user to at least one of a change in a level of attentiveness of a driver of the vehicle, a change in a gaze direction of the driver, or a predicted gesture to be performed by the driver.

82. The system of paragraph 67, wherein the at least one processor is further configured to correlate, using a machine learning algorithm, the gesture performed by the user to the change in gaze direction of the user before, during, and after the gesture is performed.

83. The system of paragraph 67, wherein the at least one processor is further configured to predict, using a machine learning algorithm, the change in gaze direction of the user based on the gesture performed by the user and as a function of time.

84. The system of paragraph 67, wherein the at least one processor is further configured to predict, using a machine learning algorithm, at least one of a time or a duration of the change in gaze direction of the user based on information associated with previously detected activities of the user.

85. The system of paragraph 67, wherein the at least one processor is further configured to predict, using a machine learning algorithm, the change in gaze direction of the user based on data obtained from one or more devices, applications, or sensors associated with a vehicle that the user is driving.

86. The system of paragraph 67, wherein the at least one processor is further configured to predict, using a machine learning algorithm, a sequence or a frequency of the change in gaze direction of the user toward an object proximate the user, by detecting at least one of an activity of the user, the gesture performed by the user, or an object associated with the gesture.

87. The system of paragraph 67, wherein the at least one processor is further configured to predict, using a machine learning algorithm, a level of attentiveness of the user based on features associated with the change in gaze direction of the user.

88. The system of paragraph 87, wherein the features associated with a change in gaze direction of the user comprise at least one of a time, sequence, or frequency of the change in gaze direction of the user.

89. The system of paragraph 67, wherein the detected gesture performed by the user is associated with at least one of: a body disturbance; a movement a portion of a body of the user; a movement of the entire body of the user; or a response of the user to at least one of a touch from another person, behavior of another person, a gesture of another person, or activity of another person.

90. The system of paragraph 67, wherein the at least one processor is further configured to predict the change in gaze direction of the user in a form of a distribution function.

91. A touch-free gesture recognition system, comprising: at least one processor configured to: receive image information associated with a user from an image sensor; access information associated with a control boundary relating to a physical dimension of a device in a field of view of the user, or a physical dimension of a body of the user as perceived by the image sensor; detect in the image information a gesture performed by a user in relation to the control boundary; identify a user behavior based on the detected gesture; and generate a message or a command based on the identified user behavior.

92. A system, comprising: at least one processor configured to: receive image information from an image sensor; detect in the image information at least one of a gesture or an activity performed by the user; predict a change in gaze direction of the user before, during, and after at least one of the gesture or the activity is performed by the user, based on a correlation between at least one of the detected gesture or the detected activity, and the change in gaze direction of the user; and control an operation of a vehicle of the user based on the predicted change in gaze direction of the user.

Embodiments of the present disclosure may also include methods and computer-executable instructions stored in one or more non-transitory computer readable media, consistent with the numbered paragraphs above and the embodiments disclosed herein.

What is claimed is:

1. A touch-free gesture recognition system, comprising: at least one processor configured to:
   receive image information from an image sensor;
   detect in the image information a gesture performed by a user;
   detect a location of the gesture in the image information;
   access information associated with a control boundary, the control boundary relating to a physical dimension of a device in a field of view of the user, or a physical dimension of a body of the user as perceived by the image sensor;
   predict a user behavior, based on at least one of the detected gesture, the detected gesture location, or a relationship between the detected gesture location and the control boundary; and
   generate a message or a command based on the predicted user behavior.

2. The system of claim 1, wherein the at least one processor is configured to predict the user behavior using a machine learning algorithm.

3. The system of claim 1, wherein the at least one processor is further configured to predict an intention of the user to perform a particular gesture or activity by:
   detecting a movement patterns within a sequence of the received image information; and
   correlating, using a machine learning algorithm, the detected movement pattern to the intention of the user to perform the particular gesture.

4. The system of claim 1, wherein the user is located in a vehicle, and wherein the at least one processor is further configured to predict an intention of the user to perform a particular gesture by:
   receiving sensor information from a second sensor associated with the vehicle;
   detecting a pattern within a sequence of the received sensor information; and
   correlating, using a machine learning algorithm, the sensor information to one or more detected gesture or activity the user performs.

5. The system of claim 4, wherein the received sensor information is indicative of a location of a body part of the user in a three-dimensional space, or a movement vector of a body part of the user.

6. The system of claim 4, wherein the second sensor associated with the vehicle of the user comprises a light sensor, an infrared sensor, an ultrasonic sensor, a proximity sensor, a reflectivity sensor, a photosensor, an accelerometer, or a pressure sensor.

7. The system of claim 1, wherein the at least one processor is configured to predict the user behavior based on the control boundary and at least one of the detected gesture, the detected gesture location, or the relationship between the detected gesture location and the control boundary.

8. The system of claim 7, wherein the at least one processor is further configured to correlate, using a machine learning algorithm, the received sensor information to the intention of the user to perform at least one of the particular gesture or the activity.

9. The system of claim 7, wherein the received sensor information is data related to an environment in which the user is located.

10. The system of claim 1, wherein the at least one processor is further configured to:
    receive, from a second sensor, data associated with a vehicle of the user, the data associated with the vehicle of the user comprising at least one of speed, acceleration, rotation, movement, operating status, or active application associated with the vehicle; and generate a message or a command based on at least one of the data associated with the vehicle and the predicted user behavior.

11. The system of claim 1, wherein the at least one processor is further configured to:
receive data associated with at least one of past predicted events or forecasted events, the at least one of past predicted events or forecasted events being associated with actions, gestures, or behavior of the user; and
generate a message or a command based on at least the received data.

12. The system of claim 1, wherein the user is located in a vehicle, and the at least one processor is further configured to:
receive, from a second sensor, data associated with a speed of the vehicle, an acceleration of the vehicle, a rotation of the vehicle, a movement of the vehicle, an operating status of the vehicle, or an active application associated with the vehicle; and
predict the user behavior, an intention to perform a gesture, or an intention to perform an activity using the received data from the second sensor.

13. The system of claim 1, wherein the at least one processor is further configured to:
receive data associated with at least one of past predicted events or forecasted events, the at least one of past predicted events or forecasted events being associated with actions, gestures, or behavior of the user; and
predict at least one of the user behavior, an intention to perform a gesture, or an intention to perform an activity based on the received data.

14. The system of claim 1, wherein the at least one processor is further configured to predict the user behavior, based on detecting and classifying the gesture in relation to at least one of the body of the user, a face of the user, or an object proximate the user.

15. The system of claim 14, wherein the at least one processor is further configured to predict at least one of the user behavior, user activity, or level of attentiveness to the road, based on detecting and classifying the gesture in relation to at least one of the body of the user or the object proximate the user.

16. The system of claim 14, wherein the at least one processor is further configured to predict the user behavior, the user activity, or the level of attentiveness to the road, based on detecting a gesture performed by a user toward a mobile device or an application running on a digital device.

17. The system of claim 1, wherein the predicted user behavior further comprises at least one of the user performing a particular activity, the user being involved in a plurality of activities simultaneously, a level of attentiveness, a level of attentiveness to the road, a level of awareness, or an emotional response of the user.

18. The system of claim 17, wherein the attentiveness of the user to the road is predicted by detecting at least one of a gesture performed by the user toward a mirror in a car or a gestured performed by the user to fix the side mirrors.

19. The system of claim 1, wherein the at least one processor is further configured to predict a change in a gaze direction of the user before, during, and after the gesture performed by the user, based on a correlation between the detected gesture and the predicted change in gaze direction of the user.

20. The system of claim 1, wherein the at least one processor is further configured to:
receive, from a second sensor, data associated with a vehicle of the user, the data associated with the vehicle of the user comprising at least one of speed, acceleration, rotation, movement, operating status, or active application associated with the vehicle; and
change an operation mode of the vehicle based on the received data.

21. The system of claim 20, wherein the at least one processor is further configured to detect a level of attentiveness of the user to the road during the change in operation mode of the vehicle by:
detecting at least one of a behavior or an activity of the user before the change in operation mode and during the change in operation mode.

22. The system of claim 21, wherein the change in operation mode of the vehicle comprises changing between a manual driving mode and an autonomous driving mode.

23. The system of claim 1, wherein the at least one processor is further configured to predict the user behavior using information associated with the detected gesture performed by the user, the information comprising at least one of speed, smoothness, direction, motion path, continuity, location, or size.

* * * * *

UNITED STATES PATENT AND TRADEMARK OFFICE
CERTIFICATE OF CORRECTION

PATENT NO. : 11,137,832 B2
APPLICATION NO. : 16/703759
DATED : October 5, 2021
INVENTOR(S) : Itay Katz Page 1 of 1

It is certified that error appears in the above-identified patent and that said Letters Patent is hereby corrected as shown below:

In the Claims

Claim 3, Column 42, Line 23, "detecting a movement patterns" should read --detecting a movement pattern--.

Signed and Sealed this
Twenty-eighth Day of December, 2021

Drew Hirshfeld
*Performing the Functions and Duties of the*
*Under Secretary of Commerce for Intellectual Property and*
*Director of the United States Patent and Trademark Office*